（12）United States Patent
Stojanovic et al.

(10) Patent No.: US 10,915,233 B2
(45) Date of Patent: Feb. 9, 2021

(54) AUTOMATED ENTITY CORRELATION AND CLASSIFICATION ACROSS HETEROGENEOUS DATASETS

(71) Applicant: Oracle International Corporation, Redwood Shores, CA (US)

(72) Inventors: Alexander Sasha Stojanovic, Los Gatos, CA (US); Philip Ogren, Boulder, CO (US); Kevin L. Markey, Longmont, CO (US); Mark Kreider, Arvada, CO (US)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 299 days.

(21) Appl. No.: 14/864,513

(22) Filed: Sep. 24, 2015

(65) Prior Publication Data
US 2016/0092475 A1    Mar. 31, 2016

Related U.S. Application Data

(60) Provisional application No. 62/056,475, filed on Sep. 26, 2014.

(51) Int. Cl.
*G06F 16/21* (2019.01)
*G06F 16/22* (2019.01)
(Continued)

(52) U.S. Cl.
CPC ...... *G06F 3/04847* (2013.01); *G06F 3/04883* (2013.01); *G06F 16/211* (2019.01);
(Continued)

(58) Field of Classification Search
CPC ............ G06F 16/2379; G06F 16/9038; G06F 16/211; G06F 16/2219
(Continued)

(56) References Cited

U.S. PATENT DOCUMENTS

| 6,047,283 A | 4/2000 | Braun |
| 6,556,983 B1 | 4/2003 | Altschuler et al. |

(Continued)

FOREIGN PATENT DOCUMENTS

| CN | 102254017 A | 11/2011 |
| CN | 102483777 A | 5/2012 |

(Continued)

OTHER PUBLICATIONS

Securing the Hadoop Ecosystem, ATM (Cloudera) & Tucu (Cloudera), Hadoop Summit, Jun. 2013 [retrieved Dec. 23, 2015]. Retrieved from the Internet: <URL: http://www.slideshare.net/Hadoop_Surnmit/abdelnur-myers-june261120room230av2>, 27 pages.
(Continued)

*Primary Examiner* — Joshua Bullock
(74) *Attorney, Agent, or Firm* — Kilpatrick Townsend & Stockton LLP

(57) ABSTRACT

The present disclosure describes techniques for entity classification and data enrichment of data sets. A data enrichment system is disclosed that can extract, repair, and enrich datasets, resulting in more precise entity resolution and classification for purposes of subsequent indexing and clustering. Disclosed techniques may include performing entity recognition to identify segments of interest that relate to an entity. Related data may be analyzed for classification, which can be used to transform the data for enrichment to its users.

26 Claims, 22 Drawing Sheets

(51) Int. Cl.
*G06F 16/23* (2019.01)
*G06F 16/9038* (2019.01)
*G06F 3/0484* (2013.01)
*G06F 3/0488* (2013.01)
*G06T 11/20* (2006.01)

(52) U.S. Cl.
CPC ...... *G06F 16/2219* (2019.01); *G06F 16/2379* (2019.01); *G06F 16/9038* (2019.01); *G06T 11/206* (2013.01); *G06T 2200/24* (2013.01)

(58) Field of Classification Search
USPC .................................................... 707/805
See application file for complete search history.

(56) References Cited

U.S. PATENT DOCUMENTS

| | | | |
|---|---|---|---|
| 6,807,558 | B1 | 10/2004 | Hassett et al. |
| 7,571,177 | B2 | 8/2009 | Damle |
| 8,155,951 | B2 | 4/2012 | Jamieson |
| 8,234,285 | B1 | 7/2012 | Cohen |
| 8,799,207 | B1 | 8/2014 | Stolte et al. |
| 8,874,616 | B1 | 10/2014 | Coffman et al. |
| 9,489,397 | B1* | 11/2016 | Olson .................... G06F 16/29 |
| 10,296,192 | B2 | 5/2019 | Stojanovic et al. |
| 2002/0107861 | A1* | 8/2002 | Clendinning .......... G06Q 30/02 |
| 2002/0152201 | A1 | 10/2002 | Nanavati et al. |
| 2004/0260695 | A1 | 12/2004 | Brill |
| 2005/0071140 | A1 | 3/2005 | Ben-Hur et al. |
| 2005/0278307 | A1 | 12/2005 | Battagin et al. |
| 2006/0075021 | A1 | 4/2006 | Sugiyama et al. |
| 2007/0047279 | A1* | 3/2007 | Evans ..................... G06F 9/541 365/1 |
| 2007/0112827 | A1* | 5/2007 | Dettinger .......... G06F 17/30539 |
| 2008/0027929 | A1 | 1/2008 | Rice et al. |
| 2008/0281820 | A1* | 11/2008 | Do ....................... G06F 17/303 |
| 2009/0006460 | A1 | 1/2009 | Kleinberg et al. |
| 2010/0131844 | A1 | 5/2010 | Wohlert |
| 2010/0205475 | A1 | 8/2010 | Ebrahimi et al. |
| 2010/0274821 | A1 | 10/2010 | Bernstein et al. |
| 2011/0106791 | A1 | 5/2011 | Maim |
| 2012/0101975 | A1 | 4/2012 | Khosravy |
| 2012/0117076 | A1 | 5/2012 | Austermann |
| 2012/0136859 | A1* | 5/2012 | Shamsi ............. G06F 17/30604 707/737 |
| 2012/0166180 | A1 | 6/2012 | Au |
| 2012/0198420 | A1* | 8/2012 | Pein ....................... G06Q 10/04 717/124 |
| 2013/0054605 | A1* | 2/2013 | Yeh ...................... G06F 16/258 707/740 |
| 2013/0110792 | A1 | 5/2013 | Hudis et al. |
| 2013/0232452 | A1 | 9/2013 | Krajec et al. |
| 2014/0052688 | A1 | 2/2014 | Bansal |
| 2014/0067728 | A1 | 3/2014 | Ogren et al. |
| 2014/0074829 | A1 | 3/2014 | Schmidt |
| 2014/0115155 | A1* | 4/2014 | Bonchi .................. G06Q 10/10 709/224 |
| 2014/0222181 | A1 | 8/2014 | Hemenway et al. |
| 2014/0279865 | A1* | 9/2014 | Kumar ............. G06F 17/30699 707/609 |
| 2014/0337331 | A1 | 11/2014 | Hassanzadeh et al. |
| 2015/0106324 | A1 | 4/2015 | Puri et al. |
| 2015/0370775 | A1 | 12/2015 | Bauchot |
| 2016/0092090 | A1 | 3/2016 | Stojanovic et al. |
| 2016/0092474 | A1 | 3/2016 | Stojanovic et al. |
| 2016/0092476 | A1 | 3/2016 | Stojanovic et al. |
| 2016/0092557 | A1 | 3/2016 | Stojanovic et al. |
| 2016/0188701 | A1 | 6/2016 | Fapohunda |
| 2016/0286544 | A1 | 9/2016 | Ikeda et al. |

FOREIGN PATENT DOCUMENTS

| | | |
|---|---|---|
| CN | 102792298 | 11/2012 |
| CN | 103593199 A | 2/2014 |
| CN | 106687952 | 5/2017 |
| CN | 106796595 | 5/2017 |
| JP | 07200300 | 8/1995 |
| JP | 09269923 | 10/1997 |
| JP | 2000222196 | 8/2000 |
| JP | 2003058523 | 2/2003 |
| JP | 2012521044 | 9/2012 |
| JP | 2012529114 | 11/2012 |
| JP | 2013069016 A | 4/2013 |
| JP | 6568935 B2 | 8/2019 |
| WO | 2013146884 | 10/2013 |
| WO | 2016049437 | 3/2016 |
| WO | 2016049460 | 3/2016 |
| WO | 2016049437 A9 | 3/2017 |

OTHER PUBLICATIONS

Gensim: Topic modelling for humans, [retrieved Dec. 29, 2015]. Retrieved from the Internet: <URL: https://radimrehurek.com/gensim/>, 2 pages.

Sqoop User Guide (v1.4.2), [retrieved Dec. 29, 2015]. Retrieved from the Internet: <URL: http://sqoop.apache.org/docs/1.4.2/SqoopUserGuide.html>, 37 pages.

Apache Tika—a content analysis toolkit, Copyright 2015 [retrieved Dec. 29, 2015]. Retrieved from the Internet: <URL: http://tika.apache.org/>, 9 pages.

Commons VFS—Commons Virtual File System, The Apache Software Foundation, Feb. 28, 2014, Copyright 2002-2014 [retrieved Dec. 29, 2015]. Retrieved from the Internet: <URL: http://commons.apache.org/proper/commons-vfs/index.html>, 2 pages.

Apache Hadoop 2.7.1—HDFS Permissions Guide, [retrieved Dec. 29, 2015]. Retrieved from the Internet: <URL: http://hadoop.apache.org/docs/current/hadoop- project-dist/ hadoop-hdfs/HdfsPermissionsGuide.html>, 6 pages.

Launching Spark on YARN—Spark 0.9.0 Documentation, [retrieved Dec. 29, 2015]. Retrieved from the Internet: <URL: http://spark.apache.org/docs/0.9.0/running-on-yarn.html>, 4 pages.

Making sense of word2vec, RaRe Technologies, RaRe Machine Learning Blog, Dec. 23, 2014, Copyright 2015 [Dec. 29, 2015]. Retrieved from the Internet: <URL: http://rare-technologies.com/making-sense-of-word2vec/>, 16 pages.

Feature Extraction and Transformation—MLlib—Spark 1.5.2 Documentation, [retrieved Dec. 29, 2015]. Retrieved from the Internet: <URL: http://spark.apache.org/docs/latest/mllib-feature-extraction.html>, 9 pages.

Running Spark on YARN—Spark 1.5.2 Documentation, [retrieved Dec. 29, 2015]. Retrieved from the Internet: <URL: http://spark.apache.org/docs/latest/running-on-yarn.html>, 4 pages.

Apache Hadoop 2.6.0-cdh5.5.1—Service Level Authorization Guide, [retrieved Dec. 29, 2015]. Retrieved from the Internet: <URL: http://archive.cloudera.com/cdh5/cdh/5/hadoop/hadoop-project-dist/hadoop-common/ServiceLevelAuth.html>, 3 pages.

Commons VFS—Supported File Systems, The Apache Software Foundation, Feb. 28, 2014, Copyright 2002-2014 [retrieved Dec. 29, 2015]. Retrieved from the Internet: <URL: http://commons.apache.org/proper/commons-vfs/filesystems.html>, 6 pages.

Welcome to Apache Flume—Apache Flume, [retrieved Dec. 29, 2015]. Retrieved from the Internet: <URL: http://flume.apache.org/>, 7 pages.

Jaccard index—Wikipedia, the free encyclopedia, Wikipedia Foundation, Inc., [retrieved Dec. 29, 2015]. Retrieved from the Internet: <URL: https://en.wikipedia.org/wiki/Jaccard_index>, 5 pages.

K-means clustering—Wikipedia, the free encyclopedia, Wikipedia Foundation, Inc., [retrieved Dec. 29, 2015]. Retrieved from the Internet: <URL: https://en.wikipedia.org/wiki/K-means_clustering>, 12 pages.

Sorensen—Dice coefficient—Wikipedia, the free encyclopedia, Wikipedia Foundation, Inc., [retrieved Dec. 29, 2015]. Retrieved from the Internet: <URL: https://en.wikipedia.org/wiki/S%C3%B8rensen%E2%80%93Dice_coefficient>, 4 pages.

Suffix tree—Wikipedia, the free encyclopedia, Wikipedia Foundation, Inc., [retrieved Dec. 29, 2015]. Retrieved from the Internet: <URL: http://en.wikipedia.org/wiki/Suffix_tree>, 7 pages.

(56) References Cited

OTHER PUBLICATIONS

Trie—Wikipedia, the free encyclopedia, Wikipedia Foundation, Inc., [retrieved Dec. 29, 2015]. Retrieved from the Internet: <URL: http://en.wikipedia.org/wiki/Trie>, 8 pages.
Tversky index—Wikipedia, the free encyclopedia, Wikipedia Foundation, Inc., [retrieved Dec. 29, 2015]. Retrieved from the Internet: <URL: https://en.wikipedia.org/wiki/Tversky_index>, 2 pages.
Yago: A High-Quality Knowledge Base, Max-Planck-Institut für Informatik, [retrieved Dec. 29, 2015]. Retrieved from the Internet: <URL: http://www.mpi-inf.mpg.de/departments/databases-and-information-systems/research/yago-naga/yago//>, 4 pages.
Apache Hadoop 2.4.1—Hadoop Map Reduce Next Generation-2.4.1—Writing YARN Applications, Jun. 21, 2014 [retrieved Dec. 29, 2015]. Retrieved from the Internet: <URL: http://hadoop.apache.org/docs/r2.4.1/hadoop-yarn/hadoop-yarn-site/WritingYarnApplications.html>, 11 pages.
Angell et al., Automatic spelling correction using trigram similarity measure, Information Processing & Management, vol. 19, Issue 4, 1983, pp. 255-261 [retrievedMar. 30, 2016]. Retrieved from the Internet: <URL: https://www.researchgate.net/publication/222341347_Automatic_spelling_correction_using_trigram_similarity_measure>, 3 pages.
Dave, IndexedRDD: Efficeint Fine-Grained Updates for RDD's, http://www.slideshare.net/SparkSummit/ankur-dave, Jun. 15, 2015.
Fu et al., Learning Semantic Hierarchies via Word Embeddings, Proceedings of the 52nd Annual Meeting of the Association for Computational Linguistics, Jun. 23-25, 2014 [retrieved Dec. 29, 2015], pp. 1199-1209. Retrieved from the Internet: <URL: http://ir.hit.edu.cn/~rjfu/ publications/acl2014.pdf>.
Jaccard, P., The Distribution of the Flora in the Alpine Zone, New Phytologist, vol. 11, No. 2, Feb. 29, 1912 [retrieved Dec. 29, 2015]. Retrieved from the Internet: <URL: http://www.researchgate.net/profile/Paul_Jaccard/publication/230302439_The_distribution_of_the_flora_in_the_alpine_zone/links/02e7e51cb76619a0fa000000.pdf>, 15 pages.
Malak, M., 17 Qualities of the Ideal Recommender System, Data Science Association, Aug. 9, 2014 [retrieved Dec. 29, 2015]. Retrieved from the Internet: <URL: http://datascienceassn.org/content/17-qualities-ideal-recommender-system>, 3 pages.
Malak, M., Extending Word2Vec for Performance and Semi-Supervised Learning, Oracle, Jun. 15, 2015 [retrieved Dec. 29, 2015]. Retrieved from the Internet: <URL: http://spark-summit.org/2015/talk/extending-word2vec-for-performance-and-semi-supervised-learning>, 39 pages.
Mikolov et al., Exploiting Similarities among Languages for Machine Translation, Sep. 17, 2013 [retrieved Dec. 29, 2015]. Retrieved from the Internet: <URL: http://arxiv.org/pdf/1309.4168.pdf>, 10 pages.
Ricci, F., Part 15: Knowledge-Based Recommender Systems, [retrieved Dec. 29, 2015]. Retrieved from the Internet: <URL: http://www.ics.uci.edu/~welling/teaching/CS77Bwinter12/presentations/course_Ricci/15-KnowledgeBased.pdf>, 58 pages.
Smetanin, N., Fuzzy string search, Nikita's Blog, Mar. 24, 2011 [retrieved Dec. 29, 2015]. Retrieved from the Internet: <URL: http://ntz-develop.blogspot.com/2011/03/fuzzy-string-search.html>, 13 pages.
Suchanek et al., YAGO: A Core of Semantic Knowledge Unifying WordNet and Wikipedia, WWW 2007, May 8-12, 2007, Banff, Alberta, Canada [retrieved Dec. 29, 2015]. Retrieved from the Internet: <URL: http://www2007.org/papers/paper391.pdf>, 10 pages.
Yang et al., Learning Multi-Relational Semantics Using Neural-Embedding Models, Cornell University Library, Nov. 14, 2014 [retrieved Dec. 29, 2015]. Retrieved from the Internet: <URL: http://arxiv.org/abs/1411.4072>, 5 pages.
Buscaldi et al., LIPN-CORE: Semantic Text Similarity using n-grams, WordNet, Syntactic Analysis, ESA and Information Retrieval based Features, Second Joint Conference on Lexical and Computational Semantics Proceedings of the Main Conference and the Shared Task, Jun. 13, 2013, pp. 162-168.
Islam et al., Text Similarity Using Google Tri-grams, Artificial Intelligence, Springer Berlin Heidelberg, May 28, 2012, pp. 312-317.
Markines et al., Evaluating similarity measures for emergent semantics of social tagging, International World Wide Web Conference 18th, Apr. 24, 2009, pp. 641-650.
Sedding et al., WordNet-based text document clustering, Proceedings of the 3rd Workshop on Robust Methods in Analysis of Natural Language Data, ROMANO '04, Jan. 1, 2004, pp. 104-113.
International Application No. PCT/US2015/052190, International Search Report and Written Opinion dated Dec. 9, 2015, 20 pages.
International Application No. PCT/US2015/052228, International Search Report and Written Opinion dated Nov. 18, 2015, 11 pages.
Boruvka, "O Jistém Problému Minimálnim (on a Certain Minimal Problem)", Práce Moravské přírodovědecké společnosti (Scholarty works, Faculty of Moravian), vol. III, Publication 3, 1926, pp. 37-58.
Homma et al., "An Artificial Neural Network for Spatiotemporal Bipolar patterns: Application to Phoneme Classification", 1983, pp. 31-40.
Kalchbrenner et al., "A Convolutional Neural Network for Modelling Sentences" [retrieved Feb. 2, 2017], published on Apr. 8, 2014. Retrieved from the Internet: <URL: https://arxiv.org/abs/1404.2188>, 11 pages.
Florek et al., "Sur la Liaison et la Division des Points d'un Ensemble Fini (on Liaison and Points Dividing a Finite Set)", Colloquium Mathematicae, 2.3-4 (1951): 282-235.
Edmonds, "Choosing the Word Most Typical in Context: Using a Lexical Co-occurrence Network", Proceedings of the 35th Annual Meeting of the Association for Computational Linguistics, 1997, pp. 507-509 [retrieved Apr. 17, 2017]. Retrieved from the Internet: <URL: https://arxiv.org/pdf/cs/9811009.pdf>, 3 pages.
Sanborn et al., "A Bigram Extension to Word Vector Representation" [retrieved Apr. 17, 2017]. Retrieved from the Internet:<URL:http://cs229.stanford.edu/proj2014/Adrian%20Sanborn,%20Jacek%20Skryzalin,%20A%20bigram%20extension%20to%20word%20vector%20representation.pdf>, 2014, 5 pages.
International Application No. PCT/US2015/052190, International Preliminary Report on Patentability dated Apr. 6, 2017, 18 pages.
International Application No. PCT/US2015/052228, International Preliminary Report on Patentability dated Apr. 6, 2017, 8 pages.
U.S. Appl. No. 14/864,485, "Non-Final Office Action", dated Oct. 2, 2017, 25 pages.
U.S. Appl. No. 14/864,496, Non-Final Office Action dated Nov. 2, 2017, 20 pages.
U.S. Appl. No. 14/864,520, Non-Final Office Action dated Nov. 16, 2017, 23 pages.
Ouyang et al., "Sentiment Analysis Using Convolutional Neural Network", IEEE International Conference on Computer and Information Technology; Ubiquitous Computing and Communications; Dependable, Autonomic and Secure Computing; Pervasive Intelligence and Computing, Oct. 26-28, 2015, pp. 2359-2364 [retrieved Jun. 1, 2017]. Retrieved from the Internet: <http://ieeexplore.ieee.org/document/7363395/>, 6 pages.
U.S. Appl. No. 14/864,505, Non-Final Office Action dated Mar. 7, 2018, 17 pages.
U.S. Appl. No. 14/864,485, Final Office Action dated May 16, 2018, 22 pages.
U.S. Appl. No. 14/864,496, Final Office Action dated Jul. 3, 2018, 24 pages.
U.S. Appl. No. 14/864,520, Final Office Action dated Jul. 20, 2018, 28 pages.
U.S. Appl. No. 14/864,505, Final Office Action dated Jul. 31, 2018, 22 pages.
European Application No. 15781210.8, Summons to Attend Oral Proceedings mailed on Jun. 19, 2018, 10 pages.
European Application No. 15781486.4, Office Action dated Jun. 6, 2018, 7 pages.
U.S. Appl. No. 14/864,485, Notice of Allowance dated Sep. 24, 2018, 7 pages.
Japanese Application No. 2017-516310, Office Action dated Mar. 26, 2019, 5 pages.

(56) References Cited

OTHER PUBLICATIONS

U.S. Appl. No. 14/864,496, Non-Final Office Action dated May 8, 2019, 31 pages.
Japanese Application No. 2017-516310, Notice of Decision to Grant dated Jul. 9, 2019, 3 pages.
Japanese Application No. 2017-516322, Office Action dated Aug. 6, 2019, 4 pages (3 pages of Original Document and 1 page of English Translation).
U.S. Appl. No. 14/864,520, Non-Final Office Action dated May 28, 2019, 28 pages.
European Application No. 15781486.4, Notice of Decision to Refuse dated Jul. 16, 2019, 13 pages.
European Application No. 15781486.4, Summons to Attend Oral Proceedings mailed on November 29, 2018, 8 pages.
U.S. Appl. No. 14/864,520, Non-Final Office Action dated Apr. 30, 2020, 31 pages.
CN201580046371.6 received an office action dated Feb. 3, 2020, 11 pages English Translation, 12 pages Chinese Office Action.
JP2017-516322 received an office action dated Feb. 18, 2020, 1 page English Translation, 4 pages Japanese Office Action.
U.S. Appl. No., 14/864,496 received a Non-Final Office Action dated Apr. 17, 2020, 29 pages.
Chinese Application No. CN201580047579.X, Office Action dated Apr. 21, 2020, 20 pages. 20 pages (9 pages of Original Document and 11 pages of English Translation).

\* cited by examiner

Data Enrichment Cloud Service | Catalog | Dashboard | Policies | Documentation

<Catalog | pvo_20140917_test1

Save | Cancel

| Refresh | Reset | Undo | Redo | Recommendations — 406 | Search |

Transform Script — 402

- Remove 123 columns ✕
- Rename Col_0001 to date_time ✕
- Rename Col_0003 to date_time_02 ✕
- Rename Col_0004 to url ✕
- Rename Col_0007 to url ✕
- Rename Col_0008 to city ✕
- Rename Col_0010 to state ✕
- Rename Col_0011 to hexid ✕
- Rename Col_0019 to ip ✕
- Rename Col_0063 to url_02 ✕

| | | |
|---|---|---|
| date_time_02 | date | 2012-03-12 09:21:45; 2012-03-07 18:47:25; 2012-03-12 09:35:37; 2012-03-12 08:50:35; 2012-03-06 19:03:37; 2012-03-06 18:59:39; 2012-03-12 09:25:46 2012-03-06 19:08:00 2012-03-15 18:56:34 |
| url | string | http://www.acme.com/SH55126545/VD55177927; http://www.acme.com/SH55126545/VD55179433; http://www.acme.com/SH55126545/VD55149415; http://www.acme.com/SH55126545/VD55170364; http://www.acme.com/SH55587637/VD55173699; http://www.acme.com/SH55126545/VD55173061; http://www.acme.com/SH55559040/VD55175948; http://www.acme.com/SH55580165/VD55173281; http://www.acme.com/SH55580165/VD55155528; http://www.acme.com/SH55126554/VD55147564 |
| Col_0005 | string | shoes; clothing; movies; handbags; home&garden; tools; outdoors; games; computers; automotive |
| Col_0006 | string | WABC; WCB; KLKN; WCIB; WJBF; WFTS; WPVI; KSTP; WLS; KSAT |
| url | string | comcast.net; rr.com; qwest.net; verizon.net; 66.231.145.174; morrisbb.com; mercydesmoines.org; clearwire-wmx.net; windstream.net; 99.126.116.121 |
| city | string | hawthorne; hendersonville; seminole; adel; new york; carpentersville; eden prairie; chicago; wahoo; charlotte |
| Col_0009 | string | usa |
| state | string | fl; ne; nc; il; ta; mn; pa; in; ny; tx |
| hexid | string | D84F550B-FD75-422A-AB3F-F51435,7BA6AC; E733FA17-4501-426F-A1CB-1C58A9A05ED2; 36F9EAA-9D76-44AE-BCD8-6014DF865B2D; B7C591A2-9277-40CE-8764-EBC26FFC1BC7; 6186EABD-7760-F17F-0B09-5C717AC6CCC9; B15166CA-CFA1-4889-A884-3C49292AC5F6; 2A078DC0-007E-4C55-B484-2CD7A9D1E946; 4BB3B5EA-CD07-865D-DB03-C35C19CD9FEF; D4A08085-E332-4F73-B54C-GFE220AEC3D38; B0D58E45-455D-42C7-BAEF-BC2C65D14CD3 |
| Col_0012 | string | 25-Sep-89; 15-Sep-88; 26-Mar-85; 20-Sep-91; 30-Apr-74; 17-Feb-87; 14-Aug-93; 1-Aug-88; 14-Oct-88; 30-Nov-85 |
| Col_0013 | string | F; M; U |

Recommendations for All — 404

- Format epoch date as MM/dd/yyyy for column ...
- Format epoch date as MM/dd/yyyy for column ...
- Format epoch date as MM/dd/yyyy h:mm:ss aa ...
- Format date as yy-M-d H:m:s for column dat...
- Remove time from date_time_02
- Remove date from date_time_02

| ≡ ≣ ≡ | ⟳ Refresh | ⤺ Reset | ⬅ Undo | ⬆ Redo | 🔍 Recommendations |

Transform Script

| Remove 123 columns | × | date_time_02 | date | 2012-03-12 09:21:45; 2012-03-07 18:47:25; 2012-03-12 09:35:37; 19:03:37; 2012-03-06 18:59:39; 2012-03-12 09:25:46 2012-03-06 |
|---|---|---|---|---|
| Rename Col_0001 to date_time | × | url | string | http://www.acme.com/SH55126545/VD55177927; http://www.ad http://www.acme.com/SH55126545/VD55149415; http://www.ac http://www.acme.com/SH587637/VD55178699; http://www.acme http://www.acme.com/SH59040/VD55175948; http://www.acm http://www.acme.com/SH55580165/VD55156528; http://www.acm |
| Rename Col_0003 to date_time_02 | × | Col_0005 | string | shoes; clothing; movies; handbags; home&garden; tools; outdoors |
| Rename Col_0004 to url | × | Col_0006 | string | WABC; WOI; KLKN; WCJB; WJBF; WFTS; WPVI; KSTP; WIS; KSAT |
| Rename Col_0007 to url | × | Col_0007 | string | comcast.net; rr.com; qwest.net; verizon.net; 66.231.145; morrisbl wmx.net; windstream.net; 99.126.115.121 |
| Rename Col_0010 to state | × | Col_0008 | string | hawthorne; hendersonville; seminole; adel; new york; carpentervill |
| Rename Col_0011 to hexid | × | Col_0008 | string | |
| Rename Col_0019 to ip | × | Col_0009 | string | usa |
| Rename Col_0063 to url_02 | × | state | string | fl; ne; nc; il; ia; mn; pa; in; ny; tx |
|  412 ↗ | | hexid | string | D84F550B-F075-422A-AB3F-F514357BA6AC; E733FA17-4501-42BI BC08-6014DFB65B2D; B7C591A2-9277-40CE-87C4-EBC26FFC1BC7 B15166CA-CFA1-43B9-A884-3C49292AC5F6; 2A078DC0-007E-4C5 DB03-C35C19CD9FEF; D4A08085-E392-4F73-854C-0FF20AEC3D3B |
|  | | 410 | | |
| Recommendations for All | | Col_0012 | string | 25-Sep-89; 15-Sep-88; 26-Mar-85; 20-Sep-91; 30-Apr-74; 17-Feb-87; |
| ⬅ Extract quarter_year from date_time_02 | × | Col_0013 | string | F; M; U |
| ⬅ Extract year from date_time_02 | × | Col_0014 | number | 2835601809791661455; 2838075983683193491; 2807235728348€ |
| ⬅ Rename Col_0008 to city | × | | | |
| ⬅ Enrich column Col_0008 with city.state | × | | | |
| ⬅ Enrich column Col_0008 with city.county | × | | | |
| ⬅ Enrich column Col_0008 with city.population | × | | | |
| ⬅ Enrich column Col_0008 with city.lat | × | | | |

| Transform Script | | date_time_02 | date | 2012-03-12 09:21:45; 2012-03-07 18:47:25; 2012-03-12 09:35:37; 2012-03-12 08:59:51; 2012-03-12 08:50:35; 2012-03-06 19:03:37; 2012-03-06 18:59:39; 2012-03-06 19:25:46 2012-03-06 19:08:00 2012-03-15 18:56:34 |
|---|---|---|---|---|
| Rename Col_0001 to date_time | × | url | string | http://www.acme.com/SH551265-45/VD55177927; http://www.acme.com/SH551265-45/VD55179433; http://www.acme.com/SH551265-45/VD55149415; http://www.acme.com/SH551265-45/VD55170364; http://www.acme.com/SH5587637/VD55178699; http://www.acme.com/SH551265-45/VD55173061; http://www.acme.com/SH559040/VD55175948; http://www.acme.com/SH5580165/VD55173281; http://www.acme.com/SH5580165/VD55156528; http://www.acme.com/SH551265-54/VD55147564 |
| Rename Col_0003 to date_time_02 | × | Col_0005 | string | shoes; clothing; movies; handbags; home&garden; tools; outdoors; games; computers; automotive |
| Rename Col_0004 to url | × | Col_0006 | string | WABC; WOI; KLKN; WCJB; WJBF; WFTS; WPVI; KSTP; WLS; KSAT |
| Rename Col_0007 to url | × | url | string | comcast.net; rr.com; qwest.net; verizon.net; 66.231.145; morrisbb.com; mercydesmoines.org; clearwire-wmx.net; windstream.net; 99.126.116.121 |
| Rename Col_0010 to state | × | city | string | hawthorne; hendersonville; seminole; adel; new york; carpenterville |
| Rename Col_0011 to hexid | × | lon | string | -118.35; -86.6; -82.79; -83.42; -73.94; -88.27; -93.46; -87.68; -96.62; -80.63 |
| Rename Col_0063 to url_02 | × | lat | string | 33.91; 36.29; 27.84; 31.14; 40.67; 42.12; 44.85; 41.34; 41.23; 35.2 |
| Rename Col_0008 to city | × | population ★ ✎ ≡ | string | 84716; 48533; 18934; 5422; 84133551; 38298; 61754; 2863594; 3953; 705567 |
| Enrich column city with city.population | × | Col_0009 | string | usa |
| Enrich column city with city.lat | × | state | string | fl; ne; nc; il; ia; mn; pa; in; ny; tx |
| Recommendations for All | | hexid | string | D84F560B-FD75-422A-AB3F-F514357BA6AC; E733FA17-4501-42BF-A1CB-1C5BA9AD5ED2; 36F9EA4-9D76-44AE-BC08-60140B7C591A2-9277-4DCE-87C4-EBC26FFC1BC7; 6186EA6D-7700-F17F-0809-5C717AC6CC9; B15166CA- |
| ◆ Extract day_of_year from date_time_02 | | | | |
| ◆ Extract month from date_time_02 | | | | |
| ◆ Extract quarter from date_time_02 | | | | |
| ◆ Extract year from date_time_02 | | | | |
| ◆ Enrich column city with city.state | | | | |

AUTOMATED ENTITY CORRELATION AND CLASSIFICATION ACROSS HETEROGENEOUS DATASETS

CROSS-REFERENCE TO RELATED APPLICATIONS

The present application is a non-provisional application of and claims the benefit and priority of U.S. Provisional Application No. 62/056,475, filed on Sep. 26, 2014 and titled "AUTOMATED ENTITY CORRELATION AND CLASSIFICATION ACROSS HETEROGENEOUS DATASETS," the contents of which are incorporated herein by reference for all purposes.

The present application is related to the following applications:
1) U.S. Provisional Application No. 62/056,468, filed on Sep. 26, 2014 and titled "METHOD FOR SEMANTIC ENTITY EXTRACTION BASED ON GRAPH MATCHING WITH AN EXTERNAL KNOWLEDGE-BASE AND SIMILARITY RANKING OF DATASET METADATA FOR SEMANTIC INDEXING, SEARCH, AND RETRIEVAL";
2) U.S. Provisional Application No. 62/056,471, filed Sep. 26, 2014, entitled "DECLARATIVE LANGUAGE AND VISUALIZATION SYSTEM FOR RECOMMENDED DATA TRANSFORMATIONS AND REPAIRS";
3) U.S. Provisional Application No. 62/056,474, filed Sep. 26, 2014, entitled "DYNAMIC VISUAL PROFILING AND VISUALIZATION OF HIGH VOLUME DATASETS AND REAL-TIME SMART SAMPLING AND STATISTICAL PROFILING OF EXTREMELY LARGE DATASETS";
4) U.S. Provisional Application No. 62/056,476, filed Sep. 26, 2014, entitled "DECLARATIVE EXTERNAL DATA SOURCE IMPORTATION, EXPORTATION, AND METADATA REFLECTION UTILIZING HTTP AND HDFS PROTOCOLS";
5) U.S. Provisional Application No. 62/163,296, filed May 18, 2015 and titled "CATEGORY LABELING"; and
6) U.S. Provisional Application No. 62/203,806, filed Aug. 11, 2015 and titled "SIMILARITY METRIC ANALYSIS AND KNOWLEDGE SCORING SYSTEM".

The entire contents of the above-identified patent applications are incorporated herein by reference for all purposes.

BACKGROUND

The present disclosure relates generally to data preparation and analysis. More particularly, techniques are disclosed for entity classification and data enrichment of data sets.

Before "big data" systems can analyze data to provide useful results, the data needs to be added to the big data system and formatted such that it can be analyzed. This data onboarding presents a challenge for current cloud and "big data" systems. Typically, data being added to a big data system is noisy (e.g., the data is formatted incorrectly, erroneous, outdated, includes duplicates, etc.). When the data is analyzed (e.g., for reporting, predictive modeling, etc.) the poor signal to noise ratio of the data means the results are not useful. As a result, current solutions require substantial manual processes to clean and curate the data and/or the analyzed results. However, these manual processes cannot scale. As the amount of data being added and analyzed increases, the manual processes become impossible to implement.

Processing volumes of data to identify other similarly related data becomes a challenge. Even further, heterogeneous datasets that differ by their structure, or lack thereof, may pose greater challenges for determining the content and relationship of data in those datasets. The differences in the datasets pose difficulties for identifying metadata from those datasets and further determining a relationship between those datasets. Often times, misspellings and categorization of words in datasets cause big data systems to struggle with determining the semantic similarity between the datasets. Big data systems are often times unable to determine a classification of data to enable enrichment of the data.

Certain embodiments of the present invention address these and other challenges.

BRIEF SUMMARY

The present disclosure relates generally to data preparation and analysis. More particularly, techniques are disclosed for entity classification and data enrichment of data sets. The techniques may include performing entity recognition to identify segments of interest that relate to an entity, e.g., such as a person, place, or thing. Related data may be analyzed for classification, which can be used to enrich the data.

The present disclosure relates generally to a data enrichment service that extracts, repairs, and enriches datasets, resulting in more precise entity resolution and correlation for purposes of subsequent indexing and clustering. The data enrichment service can include a visual recommendation engine and language for performing large-scale data preparation, repair, and enrichment of heterogeneous datasets. This enables the user to select and see how the recommended enrichments (e.g., transformations and repairs) will affect the user's data and make adjustments as needed. The data enrichment service can receive feedback from users through a user interface and can filter recommendations based on the user feedback. In some embodiments, the data enrichment service can analyze data sets to identify patterns in the data.

In some embodiments, a computing system may be implemented for entity classification and data enrichment of data sets. The computing system may implement a data enrichment service. The computing system may be configured to implement methods and operations described herein. In some embodiments, a system is disclosed that may include a plurality of data sources and a plurality of data targets. The system may include a cloud computing infrastructure system comprising one or more processors communicatively coupled to the plurality of data sources and communicatively coupled to the plurality of data targets, over at least one communication network. The cloud computing infrastructure system may include a memory coupled to the one or more processors, the memory storing instructions to provide a data enrichment service, where the instructions, when executed by the one or more processors, cause the one or more processors to perform one or more methods or operations described herein. Yet other embodiments relate to systems and machine-readable tangible storage media, which employ or store instructions for methods and operations described herein.

In at least one embodiment, a method may include receiving a data set from one or more data sources. The method may include creating a normalized data set by normalizing the data set based on a format of the data set. The method may include identifying a set of patterns for a set of entities in the normalized data set. The method may include extracting, based on the set of patterns, entity information corresponding to the set of entities in the normalized data set. The method may include determining a classification of the set of entities using the entity information. The method may include generating, based on the classification and the entity information, a transformed data set for the set of entities in the normalized data set. The method may include rendering a graphical interface that displays the transformed data set and information indicating a transformation to the normalized data set to generate the transformed data set.

In some embodiments, a set of pattern metrics may be computed. Each of the set of pattern metrics may be computed for a different pattern in the set of patterns. The set of patterns may include a plurality of different patterns identified for the set of entities. A difference may be determined amongst the set of pattern metrics. Based on the difference amongst the set of pattern metrics, a pattern in the set of patterns can be selected. The classification may be determined based on the selected pattern.

In some embodiments, text data may be identified in the normalized data set. The text data may correspond to each entity of the set of entities. A set of classifications may be determined for the set of entities. A set of classification metrics may be computed. Each of the set of classification metrics may be computed for a different classification in the set of classifications. The classification may be determined based on determining a difference amongst the set of classifications.

In some embodiments, normalizing a data set to create a normalized data set includes modifying the data set having the format to an adjusted format of the normalized data set. The adjusted format is different from the format.

In some embodiments, a set of patterns is identified by parsing the normalized data for an attribute in the normalized data. Each entity in the set of entities is identified based on the attribute. Identifying the set of patterns may include comparing column data amongst a plurality of columns in the normalized data set, and determining that each of a set of columns in the plurality of columns has an attribute. The one or more patterns for the set of entities may be identified based on the normalized data for each column having the attribute.

In some embodiments, the method may include comparing the set of entities in the normalized data set to one or more reference data sets obtained from a reference source; computing a similarity metric for each of the one or more reference data sets, the similarity metric indicating a measure of similarity of each of the one or more reference data sets in comparison to the set of entities. A classification can be determined using the similarity metric for each of the one or more reference data sets.

In some embodiments, a transformed data set may be generated from the normalized data set by modifying the normalized data set to include data about the classification for the set of entities.

In some embodiments, the method may include rendering an additional graphical interface that displays the normalized data, that identifies the entity information, and that indicates the classification; and receiving input indicating selection of the classification in the additional graphical interface. A transformed data set may be generated upon receiving the input.

The foregoing, together with other features and embodiments will become more apparent upon referring to the following specification, claims, and accompanying drawings.

BRIEF DESCRIPTION OF THE DRAWINGS

FIGS. 4A-4D depict examples of a user interface that provides interactive data enrichment, in accordance with an embodiment of the present invention.

FIGS. 5A-5D depict examples of various user interfaces that provide visualizations of datasets, in accordance with an embodiment of the present invention.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

The present disclosure relates generally to a data enrichment service that extracts, repairs, and enriches datasets, resulting in more precise entity resolution and correlation for purposes of subsequent indexing and clustering. In some embodiments, the data enrichment service includes an extensible semantic pipeline, which processes the data in a number of stages, from ingestion of the data to analysis of the data, to publishing of the data-to-data targets.

In certain embodiments of the present invention, prior to loading data into a data warehouse (or other data target) the data is processed through a pipeline (also referred to herein as a semantic pipeline) which includes various processing stages. In some embodiments, the pipeline can include an ingest stage, prepare stage, profile stage, transform stage, and publish stage. During processing, the data can be analyzed, prepared, and enriched. The resulting data can then be published (e.g., provided to a downstream process) into one or more data targets (such as local storage systems, cloud-based storage services, web services, data warehouses, etc.) where various data analytics can be performed on the data. Because of the repairs and enrichments made to the data, the resulting analyses produce useful results. Additionally, because the data onboarding process is automated, it can be scaled to process very large data sets that cannot be manually processed due to volume.

In some embodiments, data can be analyzed to extract entities from the data, and based on the extracted entities, the data can be repaired. For example, misspellings, address errors, and other common mistakes present a complex problem to big data systems. For small quantities of data, such errors can be manually identified and corrected. However, in very large data sets (e.g., billions of nodes or records) such manual processing is not possible. In certain embodiments of the present invention, the data enrichment service can analyze data using a knowledge service. Based on the contents of the knowledge service, entities in the data can be identified. For example, an entity can be an address, a business name, a location, a person name, an identification number, etc.

Figure 1:
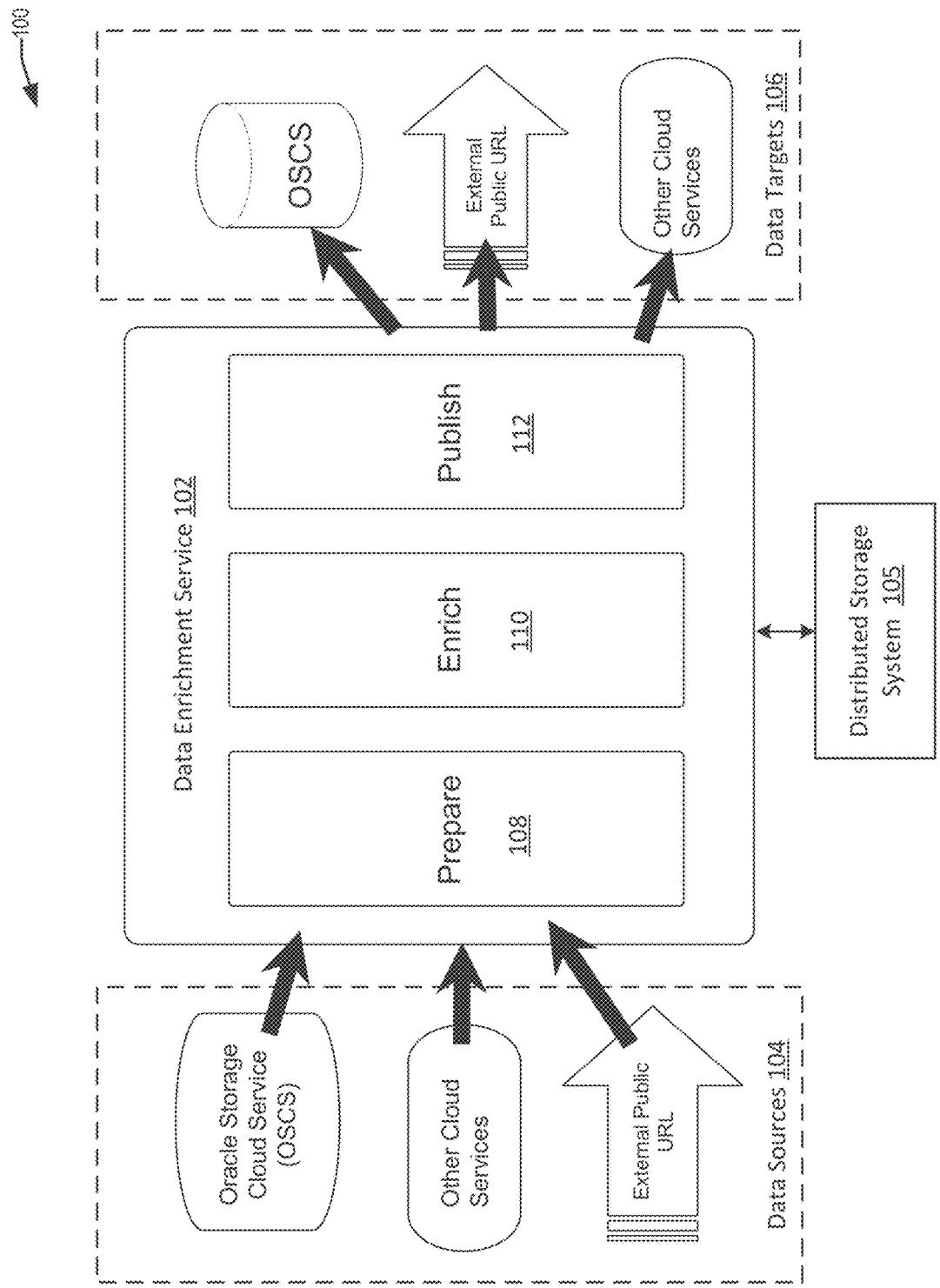
FIG. 1 depicts a simplified high-level diagram of a data enrichment system, in accordance with an embodiment of the present invention.

FIG. 1 depicts a simplified high-level diagram 100 of a data enrichment service, in accordance with an embodiment of the present invention. As shown in FIG. 1, a cloud-based data enrichment service 102 can receive data from various data sources 104. In some embodiments, a client can submit a data enrichment request to data enrichment service 102 which identifies one or more of the data sources 104 (or portions thereof, e.g., particular tables, datasets, etc.). The data enrichment service 102 may then request data to be processed from the identified data sources 104. In some embodiments, the data sources may be sampled, and the sampled data analyzed for enrichment, making large data sets more manageable. The identified data can be received and added to a distributed storage system (such as a Hadoop Distributed Storage (HDFS) system) accessible to the data enrichment service. The data may be processed semantically by a number of processing stages (described herein as a pipeline or semantic pipeline). These processing stages can include preparation stages 108, enrichment stages 110, and publishing stages 112. In some embodiments, data can be processed in one or more batches by the data enrichment services. In some embodiments, a streaming pipeline can be provided that processes data as it is received.

In some embodiments, a prepare stage 108 can include various processing sub-stages. This may include automatically detecting a data source format and performing content extraction and/or repair. Once the data source format is identified, the data source can be automatically normalized into a format that can be processed by the data enrichment service. In some embodiments, once a data source has been prepared, it can be processed by an enrich stage 110. In some embodiments, inbound data sources can be loaded into a distributed storage system 105 accessible to the data enrichment service (such as an HDFS system communicatively coupled to the data enrichment service). The distributed storage system 105 provides a temporary storage space for ingested data files, which can then also provide storage of intermediate processing files, and for temporary storage of results prior to publication. In some embodiments, enhanced or enriched results can also be stored in the distributed storage system. In some embodiments, metadata captured during enrichment associated with the ingested data source can be stored in the distributed storage system 105. System level metadata (e.g., that indicates the location of data sources, results, processing history, user sessions, execution history, and configurations, etc.) can be stored in the distributed storage system or in a separate repository accessible to the data enrichment service.

In certain embodiments, the enrichment process 110 can analyze the data using a semantic bus (also referred to herein as a pipeline or semantic pipeline) and one or more natural language (NL) processors that plug into the bus. The NL processors can automatically identify data source columns, determine the type of data in a particular column, name the column if no schema exists on input, and/or provide metadata describing the columns and/or data source. In some embodiments, the NL processors can identify and extract entities (e.g., people, places, things, etc.) from column text. NL processors can also identify and/or establish relationships within data sources and between data sources. As described further below, based on the extracted entities, the data can be repaired (e.g., to correct typographical or formatting errors) and/or enriched (e.g., to include additional related information to the extracted entities).

In some embodiments, a publish stage 112 can provide data source metadata captured during enrichment and any data source enrichments or repairs to one or more visualization systems for analysis (e.g., display recommended data transformations, enrichments, and/or other modifications to a user). The publishing sub-system can deliver the processed data to one or more data targets. A data target may correspond to a place where the processed data can be sent. The place may be, for example, a location in memory, a computing system, a database, or a system that provides a service. For example, a data target may include Oracle Storage Cloud Service (OSCS), URLs, third party storage services, web services, and other cloud services such as Oracle Business Intelligence (BI), Database as a Service, and Database Schema as a Service. In some embodiments, a syndication engine provides customers with a set of APIs to browse, select, and subscribe to results. Once subscribed and when new results are produced, the results data can be provided as a direct feed either to external web service endpoints or as bulk file downloads.

Figure 2:
FIG. 2 depicts a simplified block diagram of a technology stack, in accordance with an embodiment of the present invention.

FIG. 2 depicts a simplified block diagram 200 of a technology stack, in accordance with an embodiment of the present invention. In some embodiments, the data enrichment service can be implemented using the logical technology stack shown in FIG. 2. The technology stack can include a user interface/experience (UX) layer 202 that provides access to the data enrichment service through one or more client devices (e.g., using a thin client, thick client, web browser, or other application executing on the client devices). A scheduler service 204 can manage requests/responses received through the UX layer and can manage the underlying infrastructure on which the data enrichment service executes.

In some embodiments, the processing stages described above with respect to FIG. 1, can include a number of processing engines. For example, the prepare processing stage 108 can include ingest/prepare engines, a profiling engine and a recommendation engine. As data is ingested during prepare processing, the data (or samples thereof) can be stored in a distributed data storage system 210 (such as a "big data" cluster). The enrich processing stage 110 can include semantic/statistical engines, an entity extraction engine, and repair/transform engines. As described further below, the enrich processing stage 110 can utilize information obtained from knowledge service 206 during the enrichment process. Enrichment actions (e.g., the addition and/or transformation of data) can be performed on the data stored in the distributed storage system 210. Transformation of data may include modification to add missing data or data to enrich the data. Transformation of data may include modifying errors in the data or repairing the data. The publish processing stage 112 can include a publish engine, a syndication engine, and a metadata results manager. In some embodiments, various open source technologies can be used to implement some functionality within the various processing stages and/or processing engines. For example, file format detection can use Apache Tika.

In some embodiments, a management service 208 can monitor changes made to the data during enrichment processing 110. The monitored changes can include tracking which users accessed the data, which data transformations were performed, and other data. This can enable the data enrichment service to roll back enrichment actions.

Technology stack 200 can be implemented in an environment such as a cluster 210 for big data operations ("Big Data Cluster"). Cluster 210 can be implemented using Apache Spark, which provides a set of libraries for implementing a distributed computing framework compatible with a distributed file system (DFS) such as HDFS. Apache Spark can send requests for map, reduce, filter, sort, or Sample cluster processing jobs to effective resource managers like YARN. In some embodiments, cluster 210 can be implemented using a distributed file system offering such as one offered by Cloudera®. The DFS, such as one offered by Cloudera®, may include HDFS and Yarn.

Figure 3A:
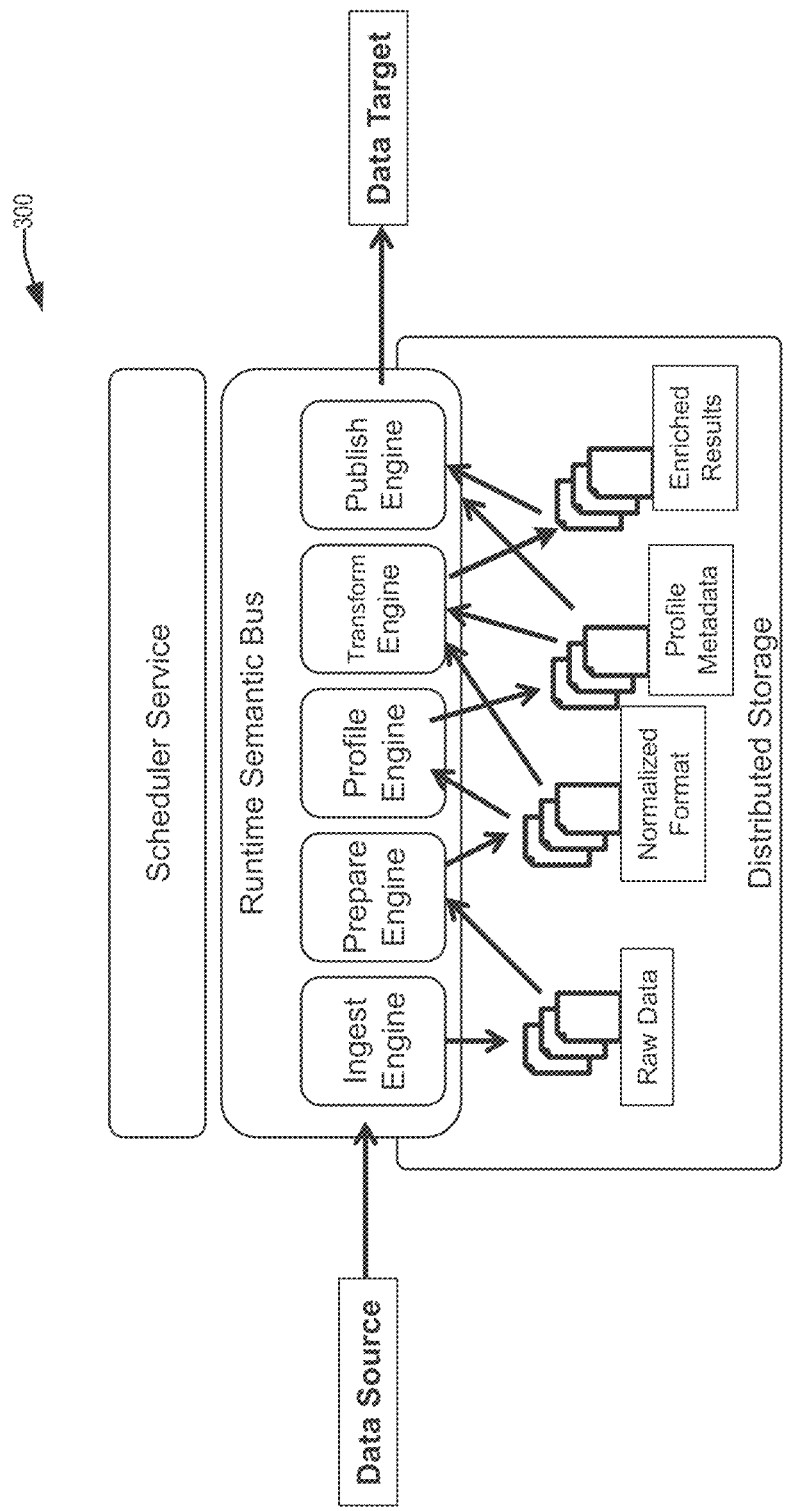
FIGS. 3A and 3B depict a simplified block diagram of a data enrichment system, in accordance with an embodiment of the present invention.

FIG. 3A depicts a simplified block diagram of a data enrichment system 300, in accordance with an embodiment of the present invention. Specifically, data enrichment system 300 may include a semantic processing pipeline, in accordance with an embodiment of the present invention. All or part of the semantic processing pipeline may be implemented by data enrichment service 102. As shown in FIG. 3A, when a data source is added, the data source and/or the data stored thereon can be processed through a pipeline prior to loading the data source. The pipeline can include one or more processing engines that are configured to process the data and/or data source before publishing the processed data to one or more data targets. The processing engines can include an ingest engine that extracts raw data from the new data source and provides the raw data to a prepare engine. The prepare engine can identify a format associated with the raw data and can convert the raw data into a format (e.g., normalize the raw data) that can be processed by the data enrichment service 302. A profile engine can extract and/or generate metadata associated with the normalized data and a transform engine can transform (e.g., repair and/or enrich) the normalized data based on the metadata. The resulting enriched data can be provided to the publish engine to be sent to one or more data targets. Each processing engine is described further below with respect to FIG. 3B.

Figure 3B:
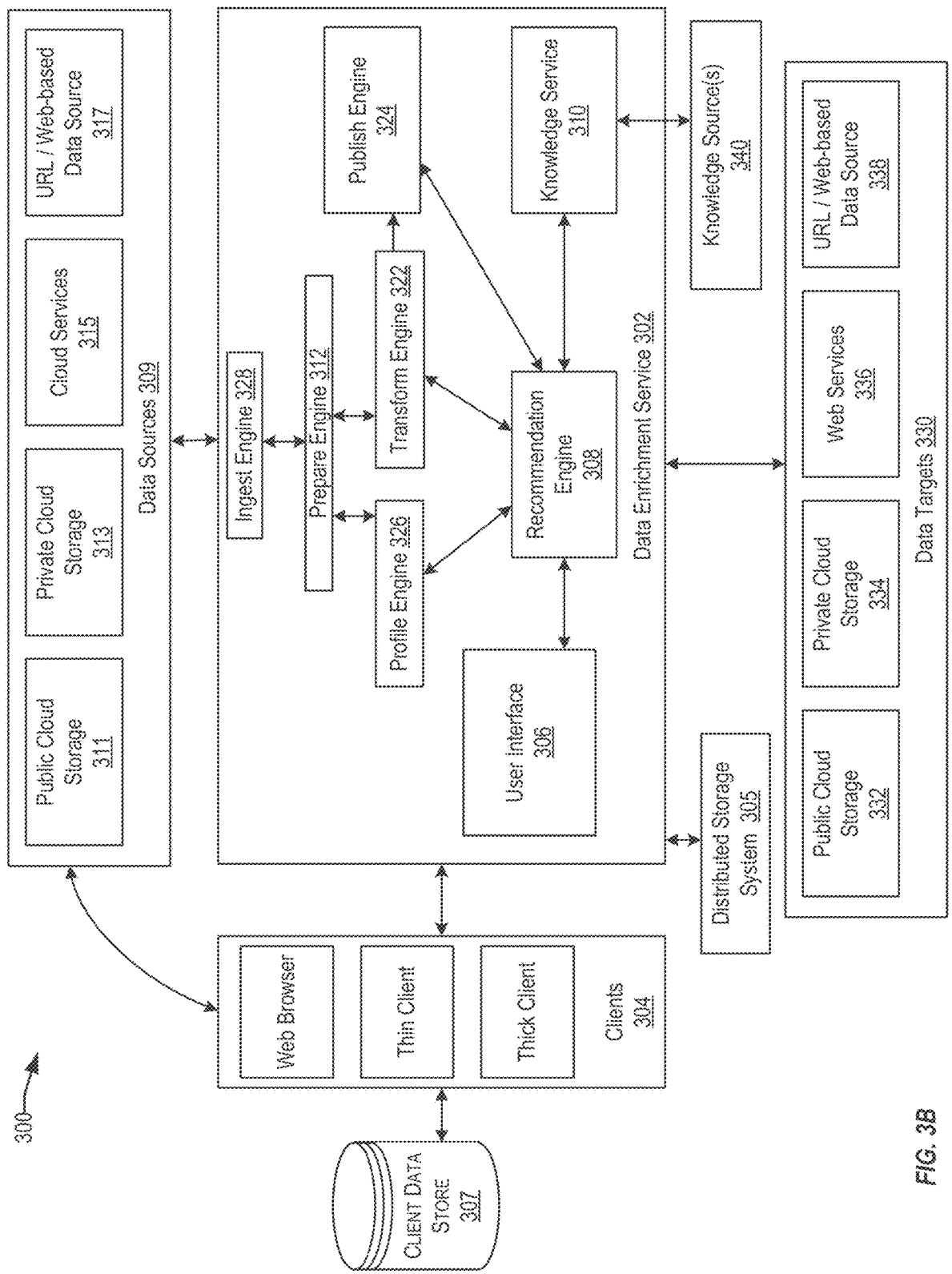

FIG. 3B depicts a simplified block diagram of data enrichment system 300, in accordance with an embodiment of the present invention. Data enrichment system 300 may implement a data enrichment service 302. Data enrichment service 302 can receive data enrichment requests from one or more clients 304. Data enrichment service 302 may comprise one or more computers and/or servers. Data enrichment service 302 may be a module that is comprised of several subsystems and/or modules, including some, which may not be shown. Data enrichment service 302 may have more or fewer subsystems and/or modules than shown in the figure, may combine two or more subsystems and/or modules, or may have a different configuration or arrangement of subsystems and/or modules. In some embodiments, data enrichment service 302 may include user interface 306, ingest engine 328, recommendation engine 308, knowledge service 310, profile engine 326, transform engine 322, a prepare engine 312, and publish engine 324. The elements implementing data enrichment service 302 may operate to implement a semantic processing pipeline as described above.

In some embodiments, data enrichment service 302 may be provided by a computing infrastructure system (e.g., a cloud computing infrastructure system). The computing infrastructure system may be implemented in a cloud computing environment having one or more computing systems. The computing infrastructure system may be communicatively coupled, over one or more communication networks, to one or more data sources or one or more data targets such as those described herein.

The clients 304 can include various client devices (such as desktop computers, laptop computers, tablet computers, mobile devices, etc.). Each client device can include one or more client applications 304 through which the data enrichment service 302 can be accessed. For example, a browser application, a thin client (e.g., a mobile app), and/or a thick client can execute on the client device and enable the user to interact with the data enrichment service 302. The embodiment depicted in FIGS. 3A and 3B are merely examples and are not intended to unduly limit the claimed embodiments of the present invention. One of ordinary skill in the art would recognize many variations, alternatives, and modifications. For example, there may be more or fewer client devices than those shown in FIG. 3B.

The client devices 304 may be of various different types, including, but not limited to personal computers, desktops, mobile or handheld devices such as a laptop, a mobile phone, a tablet, etc., and other types of devices. A communication network facilitates communications between client devices 304 and data enrichment service 302. The communication network can be of various types and can include one or more communication networks. Examples of communication network 106 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, the communication network may include any communication network or infrastructure that facilitates communications between clients and data enrichment service 302.

A user can interact with the data enrichment service 302 through user interface 306. Clients 304 can render a graphical user interface to display the user's data, recommendations for transforming the user's data, and to send and/or receive instructions ("transformation instructions") to the data enrichment service 302 through user interface 306. The user interfaces disclosed herein, such as those references in FIGS. 4A-4D, 5A-5D, 8A, and 8B, may be rendered by data enrichment service 302 or via clients 304. For example, a user interface may be generated by user interface 306, and rendered by data enrichment service 302 at any one of clients 304. A user interface may be provided by data enrichment system 302 via network as part of a service (e.g., a cloud service) or a network-accessible application. In at least one example, an operator of a data enrichment service 302 may operate one of clients 304 to access and interact with any user interfaces disclosed herein. The user can send instructions to user interface 306 to add data sources (e.g., provide data source access and/or location information, etc.).

Data enrichment service 302 may ingest data using ingest engine 328. Ingest engine 328 can serve as an initial processing engine when a data source is added. The ingest engine 328 can facilitate safe, secure, and reliable uploading of user data from one or more data sources 309 into data enrichment service 302. In some embodiments, ingestion engine 328 can extract data from the one or more data sources 309 and store it in a distributed storage system 305 in data enrichment service 302. Data ingested from one or more data sources 309 and/or one or more clients 304 can be processed as described above with respect to FIGS. 1-2 and stored in a distributed storage system 305. Data enrichment service 302 can receive data from a client data store 307 and/or from one or more data sources 309. The distributed storage system 305 can serve as temporary storage for the uploaded data during the remaining processing stages of the pipeline, prior to the data being published to one or more data targets 330. Once an upload is complete, the prepare engine 312 can be invoked to normalize the uploaded data set.

The received data may include structured data, unstructured data, or a combination thereof. Structure data may be based on data structures including, without limitation, an array, a record, a relational database table, a hash table, a linked list, or other types of data structures. As described above, the data sources can include a public cloud storage service 311, a private cloud storage service 313, various other cloud services 315, a URL or web-based data source 317, or any other accessible data source. A data enrichment request from the client 304 can identify a data source and/or particular data (tables, columns, files, or any other structured or unstructured data available through data sources 309 or client data store 307). Data enrichment service 302 may then access the identified data source to obtain the particular data specified in the data enrichment request. Data sources can be identified by address (e.g., URL), by storage provider name, or other identifier. In some embodiments, access to a data source may be controlled by an access management service. The client 304 may display a request to the user to input a credential (e.g., username and password) and/or to authorize the data enrichment service 302 to access the data source.

In some embodiments, data uploaded from the one or more data sources 309 can be modified into various different formats. The prepare engine 312 can convert the uploaded data into a common, normalized format, for processing by data enrichment service 302. Normalizing may be performed by routines and/or techniques implemented using instructions or code, such as Apache Tika distributed by Apache®. The normalized format provides a normalized view of data obtained from the data source. In some embodiments, the prepare engine 312 can read a number of different file types. Prepare engine 312 can normalize the data into a character separated form (e.g., tab separated values, comma separated values, etc.) or as a JavaScript Object Notation (JSON) document for hierarchical data. In some embodiments, various file formats can be recognized and normalized. For example, standard file formats such as Microsoft Excel® formats (e.g., XLS or XLSX), Microsoft Word® formats (e.g., DOC or DOCX), and portable document format (PDF), and hierarchical formats like JSON and extended markup language (XML), can be supported. In some embodiments, various binary encoded file formats and serialized object data can also be read and decoded. In some embodiments, data can be provided to the pipeline in Unicode format (UTF-8) encoding. Prepare engine 312 can perform context extraction and conversion to the file types expected by data enrichment service 302, and can extract document level metadata from the data source.

Normalizing a data set mat include converting raw data in a data set into a format that is processable by the data enrichment service 302, in particular profile engine 326. In one example, normalizing the data set to create a normalized data set includes modifying the data set having one format to an adjusted format as a normalized data set, the adjusted format being different from the format. A data set may be normalized by identifying one or more columns of data in the data set, and modifying a format of the data corresponding to the columns to the same format. For example, data having different formatted dates in a data set may be normalized by changing the formats to a common format for the dates that can be processed by profile engine 326. Data may be normalized by being modified or converted from a non-tabular format to a tabular format, having one or more columns of data.

Once the data has been normalized, the normalized data can be passed to profile engine 326. The profile engine 326 can perform a column by column analysis of normalized data to identify the types of data stored in the columns and information about how the data is stored in the columns. In this disclosure, although profile engine 326 is described in many instances as performing operations on data, the data processed by profile engine 326 has been normalized by prepare engine 312. In some embodiments, the data processed by profile engine 326 may include data that is not normalized for being in a format (e.g., a normalized format) processable by profile engine 326. The output, or results, of profile engine 326 may be metadata (e.g., source profile) indicating profile information about the data from a source. The metadata may indicate one or more patterns about the data and/or a classification of the data. As further described below, the metadata may include statistical information based on analysis of the data. For example, profile engine 326 can output a number of metrics and pattern information about each identified column, and can identify schema information in the form of names and types of the columns to match the data.

The metadata generated by profile engine 326 may be used by other elements of data enrichment service, e.g., recommendation engine 308 and transformation engine 322, to perform operations as described herein for data enrichment service 302. In some embodiments, the profile engine 326 can provide metadata to a recommendation engine 308.

Recommendation engine 308 can identify repair, transform, and data enrichment recommendations for the data processed by profile engine 326. The metadata generated by profile engine 326 can be used to determine recommendations for data based on the statistical analysis and/or classifications indicated by the metadata. In some embodiments, recommendations can be provided to the user through a user interface or other web service. Recommendations can be tailored for business users, such that the recommendations describe at a high level what data repairs or enrichments are available, how those recommendations compare to past user activity, and/or how unknown items can be classified based on existing knowledge or patterns. Knowledge service 310 can access one or more knowledge graphs or other knowledge sources 340. The knowledge sources can include publicly available information published by web sites, web services, curated knowledge stores, and other sources. Recommendation engine 308 can request (e.g., query) knowledge service 310 for data that can be recommended to a user for the data obtained for a source.

In some embodiments, transform engine 322 can present the user with the sampled data for each column, or sample rows from the input dataset through user interface 306. Through user interface 306, data enrichment service 302 may present a user with recommended transformations. The transformations may be associated with transformation instructions, which may include code and/or function calls to perform transformation actions. The transformation instructions may be invoked by a user based on selection at user interface 306, such as by selecting a recommendation for transformation or by receiving input indicating an operation (e.g., an operator command). In one example, transformation instructions include a transformation instruction to rename at least one column of data based on the entity information. A further transformation instruction can be received to rename the at least one column of data to a default name. A default name may include a name that is pre-determined. A default name may be any name that is pre-defined when a name for a column of data cannot be determined or is not defined. The transformation instructions can include a transformation instruction to reformat at least one column of data based on the entity information, and a transformation instruction to obfuscate at least one column of data based on the entity information. In some embodiments, the transformation instructions can include an enrichment instruction to add one or more columns of data obtained from the knowledge service based on the entity information.

Through user interface 306, a user can perform transform actions, and the transform engine 322 can apply them to the data obtained from a data source and display the results. This gives the user immediate feedback that can be used to visualize and verify the effects of the transform engine 322 configuration. In some embodiments, the transform engine 322 can receive pattern and/or metadata information (e.g., column names and types) from profile engine 326 and recommendation engine 308, which provides recommended transform actions. In some embodiments, transform engine 322 can provide a user event model that orchestrates and tracks changes to the data to facilitate undo, redo, delete, and edit events. The model can capture dependencies between actions so that the current configuration is kept consistent. For example, if a column is removed, then recommended transform actions provided by the recommendation engine 308 for that column can also be removed. Similarly, if a transform action results in inserting new columns and that action is deleted, then any actions performed on the new columns are also deleted.

As described above, during processing the received data can be analyzed and a recommendation engine 308 can present one or more recommended transforms to be made to the data, including enrichment, repair, and other transforms. A recommended transform for enriching data may be comprised of a set of transforms, each transform of which is a single transform action, or an atomic transformation, performed on the data. A transform may be performed on data that was previously transformed by another transform in the set. The set of transforms may be performed in parallel or in a particular order, such that the data resulting after performing the set of transforms is enriched. The set of transforms may be performed according to a transform specification. The transform specification may include transformation instructions that indicate how and when to perform each of the set of transforms on the data produced by profile engine 326 and the recommendation for enriching the data determined by recommendation engine 308. Examples of the atomic transformation may include, without limitation, transforms to headers, conversions, deletions, splits, joins, and repairs. The data that is transformed according to the set of transforms may undergo a series of changes, each of which results in intermediate data the data is enriched. The data generated for intermediate steps for the set of transforms may be stored in a format such as an Resilient Distributed Dataset (RDD), text, a data record format, a file format, any other format, or a combination thereof.

In some embodiments, the data generated as a result of the operations performed by any elements of data enrichment service 302 may be stored in an intermediary data format including, but not limited to, RDD, text, a document format, any other type of format, or a combination thereof. The data stored in the intermediary format may be used to further perform operations for data enrichment service 302.

The following tables illustrate examples of transformations. Table 1 shows an outline of types of transforms actions.

TABLE 1

| Transform Types | Function Parameter(s) | Description | Examples |
| --- | --- | --- | --- |
| Update | String => String | Update column values | Obfuscate, date format, |
| Split | String => Array[String] | Split a column's values into new columns | Regex split, delimiter split |
| Filter | String => Boolean | Filter rows based on a single column's values | White list filtering, date range filtering |
| Multi-column Filter | Array[String] => Boolean | Filter rows based on multiple column values | NER false positives filtering |
| Edit Columns | Array[String] => Array[String] | Edit the existing columns | Reorder, remove, swap columns |
| Extract | (String, String) => Array[Array[String]] | Extract values from a column into a new RDD | NER with results extracted to a new table |

TABLE 1-continued

| Transform Types | Function Parameter(s) | Description | Examples |
|---|---|---|---|
| Insert | String => Array[String] | Insert new columns | Insert timestamp |
| Insert 1:M | String => Array[Array[String]] | Insert new columns in a one-to-many way | Insert NER results |

Table 2 shows transform actions that do not fit within the category types shown with reference to Table 1.

TABLE 2

| Transform Actions | Description |
|---|---|
| Rename column | Rename a column |
| Sample | Replace the current RDD with a sample of it |
| Join | Performs a left-outer-join between two RDDs |
| Export | Export an RDD as columnar data to e.g. HDFS |

Table 3 below shows examples of types of transform examples. Specifically Table 3 shows examples of transform actions and describes the type of transformations corresponding to those actions. For example, a transform action may include filtering data based on detecting the presence of words from a white list in data. If a user wants to track communications (e.g., tweets) containing "Android" or "iPhone", a transform action could be added with those two words comprising the provided white list. This is just one example of the way by which data could be enriched for a user.

TABLE 3

| Transform Actions | Description | Input | Output | R1 |
|---|---|---|---|---|
| Obfuscate | Obfuscate sensitive information such as e.g. credit card numbers, ID's, or birth dates | 123-45-6789 | ###-##-#### | Y |
| Date Reformat | Reformat a column containing a date | 1330978536 2012-03-12 14:13:49 | March 05, 2012 03/12/12 02:13:49 PM | Y |
| Rename Column | Rename a column | tagged_0001 text_label_0005 | user_agent call_letters | Y |
| NER | Perform named entity recognition and insert values (see next section) | PopBooth turns your iPhone or iPad into a photo booth, prints and all | Type: Product Text: PopBooth, iPhone, iPad | Y |
| Search/Replace | Perform search and replace on a column's values | Search: Mozilla Replace: Godzilla Value: Mozilla 5.0 | Value: Godzilla 5.0 | Y |
| Change case | Change the case to lower, upper, or proper | Case: Proper Value: eden prairie | Value: Eden Prairie | Y |
| White list filter | Filter rows based on the presence of words from a white list in a text-valued column | List: Android, iPhone Value: I heart my iPhone | Keep all rows whose values contain "Android" or "iPhone" | Y |

The recommendation engine 308 can use information from a knowledge service 310, knowledge source 340 to generate recommendations for transform engine 322 and to instruct transform engine 322 to generate transform scripts that will transform the data. Transform scripts may include programs, code, or instructions that may be executable by one or more processing units to transform received data. As such, the recommendation engine 308 can serve as an intermediary between the user interface 306 and the knowledge service 310.

As discussed above, profile engine 326 can analyze data from a data source to determine whether any patterns exist, and if so, whether a pattern can be classified. Once data obtained from a data source is normalized, the data may be parsed to identify one or more attributes or fields in the structure of the data. Patterns may be identified using a collection of regular expressions, each having a label ("tag") and being defined by a category. The data may be compared to different types of patterns to identify a pattern. Examples of pattern types that can be identified include, without limitation, integers, decimals, dates or date/time strings, URLs, domain addresses, IP addresses, email addresses, version numbers, locale identifiers, UUIDs and other hexidecimal identifiers, social security numbers, US box numbers, typical US street address patterns, zipcodes, US phone numbers, suite numbers, credit card numbers, proper names, personal information, and credit card vendors.

In some embodiments, profile engine 326 may identify patterns in data based on a set of regular expressions defined by semantic constraints or syntax constraints constraints. A regular expression may be used to determine the shape and/or structure of data. Profile engine 326 may implement operations or routines (e.g., invoke an API for routines that perform processing for regular expressions) to determine patterns in data based on one or more regular expressions. For example, a regular expression for a pattern may be applied to data based on syntax constraints to determine whether the pattern is identifiable in the data.

Profile engine 326 may perform parsing operations using one or more regular expressions to identify patterns in data processed by profile engine 326. Regular expressions may be ordered according to a hierarchy. Patterns may be identified based on order of complexity of the regular expressions. Multiple patterns may match data that is being analyzed; the patterns having the greater complexity will be selected. As described further below, profile engine 326 may perform statistical analysis to disambiguate between patterns based on the application of regular expressions that are applied to determine those patterns.

In some embodiments, data that is unstructured may be processed to analyze metadata-describing attributes in the data. The metadata itself may indicate information about the data. The metadata may be compared to identify similarities and/or to determine a type of the information. The information identified based on the data may be compared to know types of data (e.g., business information, personal identification information, or address information) to identify the data that corresponds to a pattern.

In accordance with an embodiment, the profile engine 326 may perform statistical analysis to disambiguate the patterns and/or the text in data. Profile engine 326 may generate metadata including statistical information based on the statistical analysis. When patterns are identified, profile engine 326 may determine statistical information (e.g., a pattern metric) about each different pattern to disambiguate between the patterns. The statistical information may include a standard deviation for different patterns that are recognized. The metadata including the statistical information can be provided to other components of data enrichment service 302, such as recommendation engine 308. For example, the metadata may be provided to recommendation engine 308 to enable recommendation engine 308 to determine recommendations for enrichment of the data based on the identified the pattern(s). Recommendation engine 308 can use the patterns to query a knowledge service 310 to obtain additional information about the patterns. Knowledge service 310 can include or have access to one or more knowledge sources 340. A knowledge sources can include publicly available information published by web sites, web services, curated knowledge stores, and other sources.

Profile engine 326 may perform the statistical analysis to disambiguate between patterns identified in the data. For example, data analyzed by profile engine 326, may be evaluated to compute a pattern metric (e.g., a statistical frequency of different patterns in the data) for each of the different patterns identified in the data. Each of the set of pattern metrics is computed for a different pattern of the patterns that are identified. Profile engine 326 may determine a difference amongst the pattern metrics computed for the different patterns. One of the identified patterns may be selected based on the difference. For example, one pattern may be disambiguated from another pattern based on a frequency of the patterns in the data. In another example, where the data consists of dates having multiple different formats, each corresponding to a different pattern, profile engine 326 may convert the dates to a standard format in addition to normalization and may then determine a standard deviation for each format from different patterns. In this example, profile engine 326 may statistically disambiguate between the formats in the data as having the format with the lowest standard deviation. The pattern corresponding to the format of the data having the lowest standard deviation may be selected as the best pattern for the data.

Profile engine 326 may determine a classification of a pattern that it identifies. Profile engine 326 may communicate with knowledge service 310 to determine whether the identified pattern can be classified within a knowledge domain. Knowledge service 310 may determine one or more possible domains associated with the data based on techniques described herein such as matching techniques and similarity analysis. Knowledge service 310 may provide profile engine 326 with a classification of one or more domains possibly similar to data identified with a pattern. Knowledge service 310 may provide, for each of the domains identified by knowledge service 310, a similarity metric indicating a degree of similarity to the domain. The techniques disclosed herein for similarity metric analysis and scoring can be applied by recommendation engine 308 to determine a classification of data processed by profile engine 326. The metadata generated by profile engine 326 may include information about the knowledge domain, if any are applicable, and a metric indicating a degree of similarity with the data analyzed by profile engine 326.

Profile engine 326 may perform statistical analysis to disambiguate text identified in data, regardless of whether patterns are identified in the data. The text may be part of a pattern, and the analysis of the text may be used to further identify a pattern, if any can be identified. Profile engine 326 may request knowledge service 310 to perform domain analysis on text to determine whether the text can be classified into one or more domains. Knowledge service 310 may operate to provide information about one or more domains that are applicable to the text being analyzed. Analysis performed by knowledge service 310 to determine a domain may be performed using techniques described herein, such as similarity analysis used to determine a domain for data.

In some embodiments, profile engine 326 may identify text data in a data set. The text data may correspond to each entity identified in the set of entities. A classification may be determined for each entity that is identified. Profile engine 326 may request knowledge service to identify a classification for the entity. Upon determining a set of classifications for a set of entities (e.g., entities in a column), profile engine 326 may compute a set of metrics ("classification metrics") to disambiguate between the set of classifications. Each of the set of metrics may be computed for a different one of the set of classifications. Profile engine 326 may statistically disambiguate the set of metrics by comparing them to each other to determine which classification most closely represents the set of entities. A classification of the set of entities may be chosen based on the classification that represents the set of entities.

Using the knowledge sources 340, knowledge service 310 can match, in context, the patterns identified by profile engine 326. Knowledge service 310 may compare the identified patterns in the data or the data if in text to entity information for different entities stored by a knowledge source. The entity information may be obtained from one or more knowledge sources 340 using knowledge service 310. Examples of known entity may include social security numbers, telephone numbers, address, proper names, or other personal information. The data may be compared to entity information for different entities to determine if there is a match with one or more entities based on the identified pattern. For example, the knowledge service 310 can match the pattern "XXX-XX-XXXX" to the format of U.S. social security numbers. Furthermore, the knowledge service 310 can determine that social security numbers are protected or sensitive information, the disclosure of which is linked to various penalties.

In some embodiments, profile engine 326 can perform statistical analysis to disambiguate between multiple classifications identified for data processed by profile engine 326. For example, when text is classified with multiple domains, profile engine 326 can process the data to statistically determine the appropriate classification determined by knowledge service 310. The statistical analysis of the classification can be included in the metadata generated by profile engine 326.

In addition to pattern identification, profile engine 326 can analyze data statistically. The profile engine 326 can characterize the content of large quantities of data, and can provide global statistics about the data and a per-column analysis of the data's content: e.g., its values, patterns, types, syntax, semantics, and its statistical properties. For example, numeric data can be analyzed statistically, including, e.g., N, mean, maximum, minimum, standard deviation, skewness, kurtosis, and/or a 20-bin histogram if N is greater than 100 and unique values is greater than K. Content may be classified for subsequent analysis.

In one example, global statistics may include, without restriction, the number of rows, the number of columns, the number of raw and populated columns and how they varies, distinct and duplicate rows, header information, the number of columns classified by type or subtype, and the number of columns with security or other alerts. Column-specific statistics may include populated rows (e.g., K-most frequent, K-least frequent unique values, unique patterns, and (where applicable) types), frequency distributions, text metrics (e.g., minimum, maximum, mean values of: text length, token count, punctuation, pattern-based tokens, and various useful derived text properties), token metrics, data type and subtype, statistical analysis of numeric columns, L-most/least probable simple or compound terms or n-grams found in columns with mostly unstructured data, and reference knowledge categories matched by this naive lexicon, date/time pattern discovery and formatting, reference data matches, and imputed column heading label.

The resulting profile can be used to classify content for subsequent analyses, to suggest, directly or indirectly, transformations of the data, to identify relationships among data sources, and to validate newly acquired data before applying a set of transformations designed based on the profile of previously acquired data.

The metadata produced by profile engine 326 can be provided to the recommendation engine 308 to generate one or more transform recommendations. The entities that match an identified pattern of the data can be used to enrich the data with those entities identified by classification determined using knowledge service 310. In some embodiments, the data to the identified patterns (e.g., city and state) may be provided to knowledge service 310 to obtain, from a knowledge source 340, entities that match the identified patterns. For example, knowledge service 310 may be invoked calling a routine (e.g., getCities( ) and getStates( ) corresponding to the identified patterns to receive entity information. The information received from knowledge service 310 may include a list (e.g., canonical list) of entities that have properly spelled information (e.g., properly spelled cities and states) for the entities. Entity information corresponding to matching entities obtained from knowledge service 310 can be used to enrich data, e.g., normalize the data, repair the data, and/or augment the data.

In some embodiments, the recommendation engine 308 can generate transform recommendations based on the matched patterns received from the knowledge service 310. For example, for the data including social security numbers, the recommendation engine can recommend a transform that obfuscates the entries (e.g., truncating, randomizing, or deleting, all or a portion of the entries). Other examples of transformation may include, reformatting data (e.g., reformatting a date in data), renaming data, enriching data (e.g., inserting values or associating categories with data), searching and replacing data (e.g., correcting spelling of data), change case of letter (e.g., changing a case from upper to lower case), and filter based on black list or white list terms. In some embodiments, recommendations can be tailored for particular users, such that the recommendations describe at a high level what data repairs or enrichments are available. For example, an obfuscation recommendation may indicate that the first five digits of the entries will be deleted. In some embodiments, the recommendations can be generated based on past user activity (e.g., provide a recommended transform that was previously used when sensitive data was identified)

Transform engine 322 can generate transform scripts based on the recommendations provided by recommendation engine 308 (e.g., a script to obfuscate the social security numbers). A transform script may perform an operation to transform data. In some embodiments, a transform script may implement a linear transformation of data. A linear transformation may be implemented through use of an API (e.g., Spark API). The transform actions may be performed by operations invoked using the API. A transform script may be configured based on transform operations defined using the API. The operations may be performed based on the recommendations.

In some embodiments, the transform engine 322 can automatically generate transform scripts to repair data at the data source. Repairs may include automatically renaming columns, replacing strings or patterns within a column, modifying text case, reformatting data, etc. For example, the transform engine 322 can generate a transformation script to transform a column of dates based on a recommendation from recommendation engine 308 to modify, or convert, the formats of the dates in the column. The recommendation may be selected from multiple recommendations to enrich or modify the data from a data source that is processed by profile engine 326. The recommendation engine 308 may determine the recommendation based on metadata, or profile, provided by the profile engine 326. The metadata may indicate a column of dates identified for different formats (e.g., MM/DD/YYYY, DD-MM-YY, etc.). The transform script generated by transform engine 322 can, for example, split and/or join columns based on suggestions from the recommendation engine 308. The transform engine 322 may also remove columns based on the data source profiles received from profile engine 326 (e.g., to remove empty columns, or columns that include information that is not desired by the user).

A transform script may be defined using a syntax that describes operations with respect to one or more algorithms (e.g., Spark Operator Trees). As such, the syntax may describe operator-tree transduction/reduction. A transform script may be generated based on a chosen recommendation or requested by a user interactively through a graphical user interface. Examples of recommended transformations are described with reference to FIGS. 4A, 4B, 4C, and 4D. Based on the transform operations specified by a user through the graphical user interface, the transform engine 322 performs transform operations according to those operations. The transform operations may be recommended to the user to enrich a data set.

As described further below, the clients 304 can display recommendations describing or otherwise indicating each recommended transform. When a user selects a transform script to be run, the selected transform script can be run on all or more of the data from the data source in addition to the data analyzed to determine the recommended transform(s). The resulting transformed data can then be published to one or more data targets 330 by publish engine 324. In some embodiments, the data targets can be different data stores than the data sources. In some embodiments, the data targets can be the same data stores as the data sources. Data targets 330 can include a public cloud storage service 332, a private cloud storage service 334, various other cloud services 336, a URL or web-based data target 338, or any other accessible data target.

In some embodiments, recommendation engine 308 can query knowledge service 310 for additional data related to the identified platform. For example, where the data includes a column of city names, related data (e.g., location, state, population, country, etc.) can be identified and a recommendation to enrich the dataset with the related data can be presented. Examples of presenting recommendations and transforming data through a user interface are shown below with respect to FIGS. 4A-4D.

Knowledge service 310 can implement a matching method to compare the data to reference data available through knowledge service 310. Knowledge service 310 can include or have access to one or more knowledge sources 340. The knowledge sources can include publicly available information published by web sites, web services, curated knowledge stores, and other sources. Knowledge service 310 can implement a method to determine the semantic similarity between two or more datasets. This may also be used to match the user's data to reference data available through the knowledge service 310. Knowledge service 310 may perform similarity metric analysis as described in this disclosure. The techniques performed by knowledge service 310 may include those described in this disclosure including the techniques described by the references incorporated herein.

Knowledge service 310 can perform operations to implement automated data analyses. In some embodiments, knowledge service 310 can use an unsupervised machine learning tool, such as Word2Vec, to analyze an input data set. Word2Vec can receive a text input (e.g., a text corpus from a large data source) and generate a vector representation of each input word. The resulting model may then be used to identify how closely related are an arbitrary input set of words. For example, a Word2Vec model built using a large text corpus (e.g., a news aggregator, or other data source) can be utilized to determine corresponding numeric vector for each input word. When these vectors are analyzed, it may be determined that the vectors are "close" (in the Euclidean sense) within a vector space. Although this can identify that input words are related (e.g., identifying input words that are clustered closely together within a vector space), Word2Vec may not be usable to identify a descriptive label for the words (e.g., "tire manufacturers"). Knowledge service 310 may implement operations to categorize the related words using a curated knowledge source 340 (e.g., YAGO, from the Max Planck Institute for Informatics). Using information from a knowledge source 340, knowledge service 310 can add additional, related data to the input data set.

In some embodiments, knowledge service 310 may implement operations to perform trigram modeling to further refine categorization of related terms. Trigram modeling can be used to compare sets of words for category identification. The input data set can be augmented with the related terms.

Using the input data set, which may include added data, knowledge service 310 can implement matching methods (e.g., a graph matching method) to compare the words from the augmented data set to categories of data from knowledge source 340. Knowledge service 310 can implement a method to determine the semantic similarity between the augmented data set and each category in knowledge source 340 to identify a name for the category. The name of the category may be chosen based on a highest similarity metric. The similarity metric may computed be based on the number of terms in the data set that match a category name. The category may be chosen based on the highest number of terms matching based on the similarity metric. Techniques and operations performed for similarity analysis and categorization are further described below.

In some embodiments, knowledge service 310 can augment an input data set and use information from a knowledge source 340 to add additional, related data to the input data set. For example, a data analysis tool such as Word2Vec can be used to identify semantically similar words to those included in the input data set from a knowledge source, such as a text corpus from a news aggregation service. In some embodiments, knowledge service 310 can implement trigram modeling to preprocess data obtained from a knowledge source 340 (such as YAGO) to generate an indexed table of words by category. Knowledge service 310 can then create trigrams for each word in the augmented data set and match the word to a word from the indexed knowledge source 340.

Using the augmented data set (or the trigram matched augmented data set), knowledge service 310 can compare the words from the augmented data set to categories of data from knowledge source 340. For example, each category of data in the knowledge source 340 can be represented as a tree structure, with the root node representing the category, and each leaf node representing a different word belonging to that category. Knowledge service 310 can implement a method (e.g., Jaccard index, or other similarity metric) to determine the semantic similarity between the augmented data set and each category in knowledge source 510. The name of the category that matches the augmented data set (e.g., having a highest similarity metric) can then be applied as a label to the input data set.

In some embodiments, knowledge service 310 can determine the similarity of two data sets A and B, by determining the ratio of the size of the intersection of the data sets to the size of the union of the data sets. For example, a similarity metric may be computed based on the ratio of 1) the size of the intersection of an data set (e.g., an augmented data set) and a category and 2) the size of their union. The similarity metric may be computed for comparison of a data set and a category as indicated above. As such, a "best match" may be determined based on comparing the similarity metrics. The data set used for the comparison may be enriched by being augmented with a label corresponding to the category for which the best match is determined using the similarity metric.

As described above, other similarity metrics may be used in addition, or as an alternative, to the Jaccard index. One of ordinary skill in the art would recognize that any similarity metric may be used with the above described techniques. Some examples of alternative similarity metrics include, but are not limited to: the Dice-Sorensen index; the Tversky index; the Tanimoto metric; and the cosine similarity metric.

In some embodiments, knowledge service 310 may utilize a data analysis tool, such as Word2Vec, to compute a refined metric (e.g., score) that indicates a degree of match between data from a knowledge source 340 and an input data, which may be augmented with data from a knowledge source. The score ("knowledge score") may provide greater knowledge about the degree of similarity between an input data set and a category to which a comparison is made. The knowledge score may enable data enrichment service 302 to choose a category name that bests represents the input data.

In the techniques described above, knowledge service 310 may count the number of matches of terms in the input data set to a candidate category (e.g., genus) name in a knowledge source 340. The result of the comparison may yield a value that represents a whole integer. As such the value, although indicative of the degree of match between terms, may not indicate a degree of match between an input data set and different terms in a knowledge source.

Knowledge service 310 may utilize Word2Vec to determine a similarity of a comparison of each term (e.g., a term for a genus) in a knowledge source and the terms of input data (e.g., species). Using Word2Vec, knowledge service 310 can compute a similarity metric (e.g., cosine similarity or distance) between an input data set and one or more terms obtained from a knowledge source. The cosine similarity may be computed as the cosine angle between a data set of terms (e.g., a domain or genus) obtained from a knowledge source and an input data set of terms. The cosine similarity metric may be computed in a manner similar to the Tanimoto metric. By computing a similarity metric based on a cosine similarity, each term in the input data set may be considered as a faction of a whole-value integer, such as a value indicating a percentage of similarity between the term and candidate category. For example, computing a similarity metric between a tire manufacturer and a surname might result in a similarity metric of 0.3, while the similarity metric between a tire manufacturer and a company name might results in a similarity metric of be 0.5. Non-whole integer values representing similarity metrics can be close compared to provide greater accuracy for a closely matching category name. The closely matching category name may be chosen as the most applicable category name based on the similarity metric closest to a value of 1. In the example, above, based on the similarity metric, company name is more likely the correct category. As such, knowledge service 310 can associated "company" instead of "surname" with a user-supplied column of data containing tire manufactures.

Knowledge service 310 can determine information about knowledge groups (e.g., domains or categories). Information about knowledge groups can be presented in a graphical user interface. Information about knowledge domains may include a metric (e.g., a knowledge score) indicating a measure of similarity between a knowledge domain and an input data set of terms. Input data may be compared to data from a knowledge source 340. An input data set may correspond to a column of data of a data set specified by a user. The knowledge score may indicate a measure of similarity between an input data set and one or more terms provided by a knowledge source, each term corresponding to a knowledge domain. The column of data may include terms that potentially belong to knowledge domain.

In at least one embodiment, knowledge service 310 may determine a more accurate matching score. The score may correspond to a value computing using a scoring formula using techniques disclosed herein including references that are incorporated herein. The scoring formula may determine a semantic similarity between two data sets, e.g., the input data set and terms in a domain (e.g., a candidate category) obtained from a knowledge source. The domain for which the matching score indicates the best match (e.g., the highest matching score), may be chosen as the domain having the greatest similarity with the input data set. As such, the terms in the input data set may be associated with the domain name as the category.

The scoring formula may be applied to an input data set and a domain (e.g., a category of terms obtained from a knowledge source) to determine a score that indicates a measure of a match between the input data and the domain. The domain may have one or more terms, which collectively define the domain. The score may be used to determine the domain to which an input data set is most similar. The input data set may be associated with a term descriptive of the domain to which the input data set is most similar.

In some embodiments, user interface 306 can generate one or more graphical visualizations based on metadata provided by profile engine 326. As explained above, the data provided by profile engine 326 may include statistical information indicating metrics about data that has been processed by profile engine 326. Examples of graphical visualizations of metrics of profiled data are shown in FIGS. 5A-5D. A graphical visualization can include a graphical dashboard (e.g., a visualization dashboard). The graphical dashboard may indicate a plurality of metrics, each of the plurality of metrics indicating a real time metric of the data relative to a time that the data is profiled. A graphical visualization may be displayed in a user interface. For example, the graphical visualization that is generated may be sent to a client device to cause the client device to display the graphical visualization in a user interface at the client device. In some embodiments, a graphical visualization may provide profiling results.

Additionally, the structural analyses by the profile engine 326 enable the recommendation engine to better focus its queries to knowledge service 310, improving processing speed and reducing load on system resources. For example, this information can be used to limit the scope of knowledge being queried so that the knowledge service 310 does not attempt to match a column of numerical data to place names.

Figure 4C:
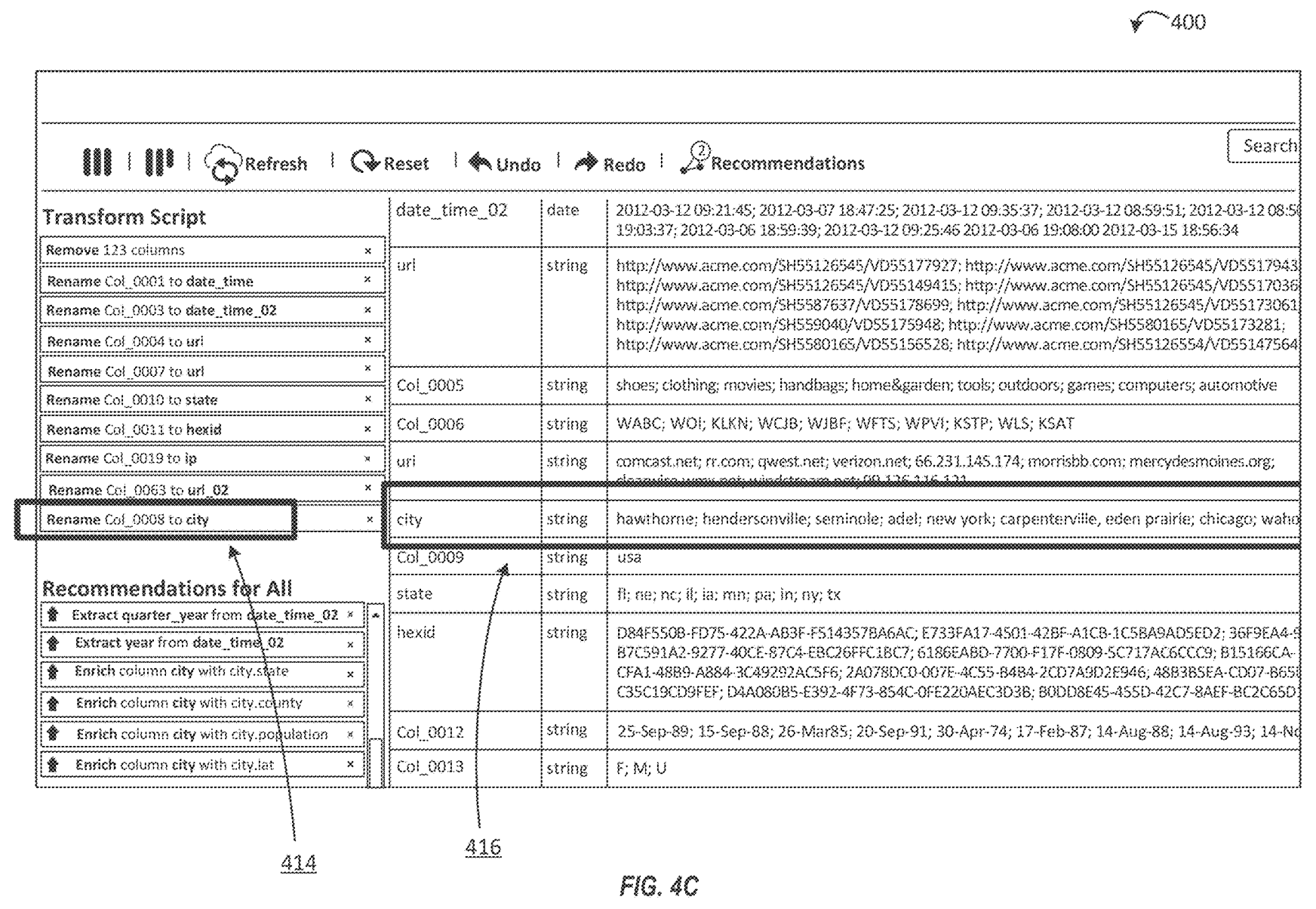

FIGS. 4A-4D depict examples of a user interface that provides interactive data enrichment, in accordance with an embodiment of the present invention. As shown in FIG. 4A, an example interactive user interface 400 can display transform scripts 402, recommended transforms 404, and at least a portion of the data 406 being analyzed/transformed. Transform scripts listed in panel 402 can include indicate transforms that have been applied to the data and are visible in panel 406. Each transform script 402 can be written in a simple declarative language intelligible to a business user. Transform scripts listed in panel 402 may be automatically applied to the data and reflected in the portion of the data 406 displayed in the interactive user interface 400. For example, the transform scripts listed in panel 402 include renaming columns to be descriptive of their content. Columns 408 shown in interactive user interface 400 have been renamed according to the transform scripts 402 (e.g., column 0003 is now named date_time_02, column 0007 is no named "url", etc.). Recommended transforms 404, however, have not been automatically applied to the user's data.

As shown in FIG. 4B, a user can view recommendations in recommendation panel 404 and based on the recommendation, identify the data to be changed. For example, recommendation 410 includes a recommendation to rename "Col_0008 to city". Because the recommendation is written such that a business user can understand it (instead of in, e.g., code or pseudo code) the corresponding data 412 can be readily identified by the user. As shown in FIG. 4B, data 412 includes a column of strings (represented as a row in user interface 400). The profile engine 326 can analyze the data to determine that it includes strings of two or fewer words (or tokens). This pattern can be provided to recommendation engine 308 which can query knowledge service 310. In this case, knowledge service 310 has matched the data pattern to city names and recommendation 408 was generated to rename the column accordingly.

In some embodiments, transforms listed in panel 404 may have been applied at the direction of the user (e.g., in response to an instruction to apply the transform) or may have been applied automatically. For example, in some embodiments, knowledge service 310 can provide a confidence score for a given pattern match. A threshold can be set in recommendation engine 308 such that matches having a confidence score greater than the threshold are applied automatically.

To accept the recommendation, the user can select an accept icon 414 (in this example an up arrow icon) associated with the recommendation. As shown in FIG. 4C, this moves the accepted recommendation 414 to transform scripts panel 402 and automatically applies the transform to the corresponding data 416. For example, in the embodiment shown in FIG. 4C, Col_0008 has now been renamed to "city" in accordance with the selected transform.

In some embodiments, data enrichment service 302 can recommend additional columns of data to be added to a data source. As shown in FIG. 4D, continuing with the city example, transforms 418 have been accepted to enrich the data with new columns including city population, and city location detail including longitude and latitude. When selected, the user's data set is enriched to include this additional information 420. The data set now includes information that was not previously available to the user in a comprehensive and automated fashion. The user's data set can now be used to produce a nationwide map of locations and population zones associated with other data in the dataset (for example, this may be associated with a company's web site transactions).

FIGS. 5A-5D depict examples of various user interfaces that provide visualizations of datasets, in accordance with an embodiment of the present invention.

Figure 5A:
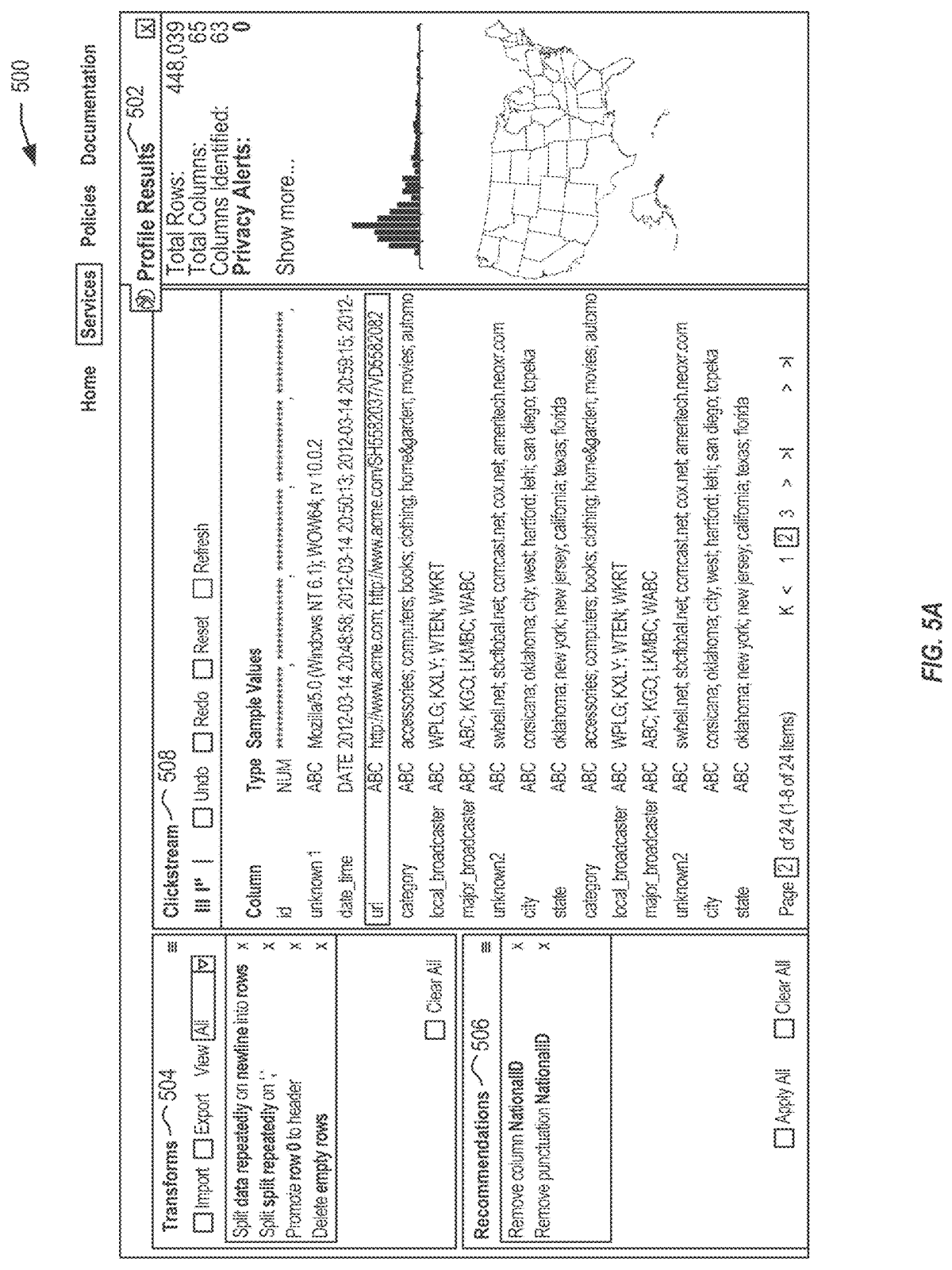

FIG. 5A depicts an example of a user interface that provides visualizations of datasets, in accordance with an embodiment of the present invention. As shown in FIG. 5A, an example interactive user interface 500 can display a profile summary 502 ("Profile Results"), transform scripts 504, recommended transforms 506, and at least a portion of the data 508 being analyzed/transformed. Transforms listed in panel 504 can include transforms that have been applied to the data and are visible in panel 508.

Profile summary 502 can include global statistics (e.g., total rows and columns) as well as column-specific statistics. The column-specific statistics can be generated from analysis of data processed by data enrichment service 302. In some embodiments, the column-specific statistics can be generated based on column information determined by analysis of data process by data enrichment service 302.

Profile summary 502 may include a map (e.g., "a heat map") of the United States, where different areas of the United States are shown in different colors, based on statistics identified from the data being analyzed 508. The statistics may indicate how frequently those locations are identified as being associated with the data. In one illustrative example, data may represent purchase transactions at an online retailer, where each transaction can be associated with a location (e.g., based on shipping/billing addresses, or based on recorded IP addresses). Profile summary 502 may indicate locations of transactions based on processing of the data representing the purchase transactions. In some embodiments, visualizations can be modified based on user input to assist the user in searching the data and finding useful correlations. These features are described further below.

Figure 5B:
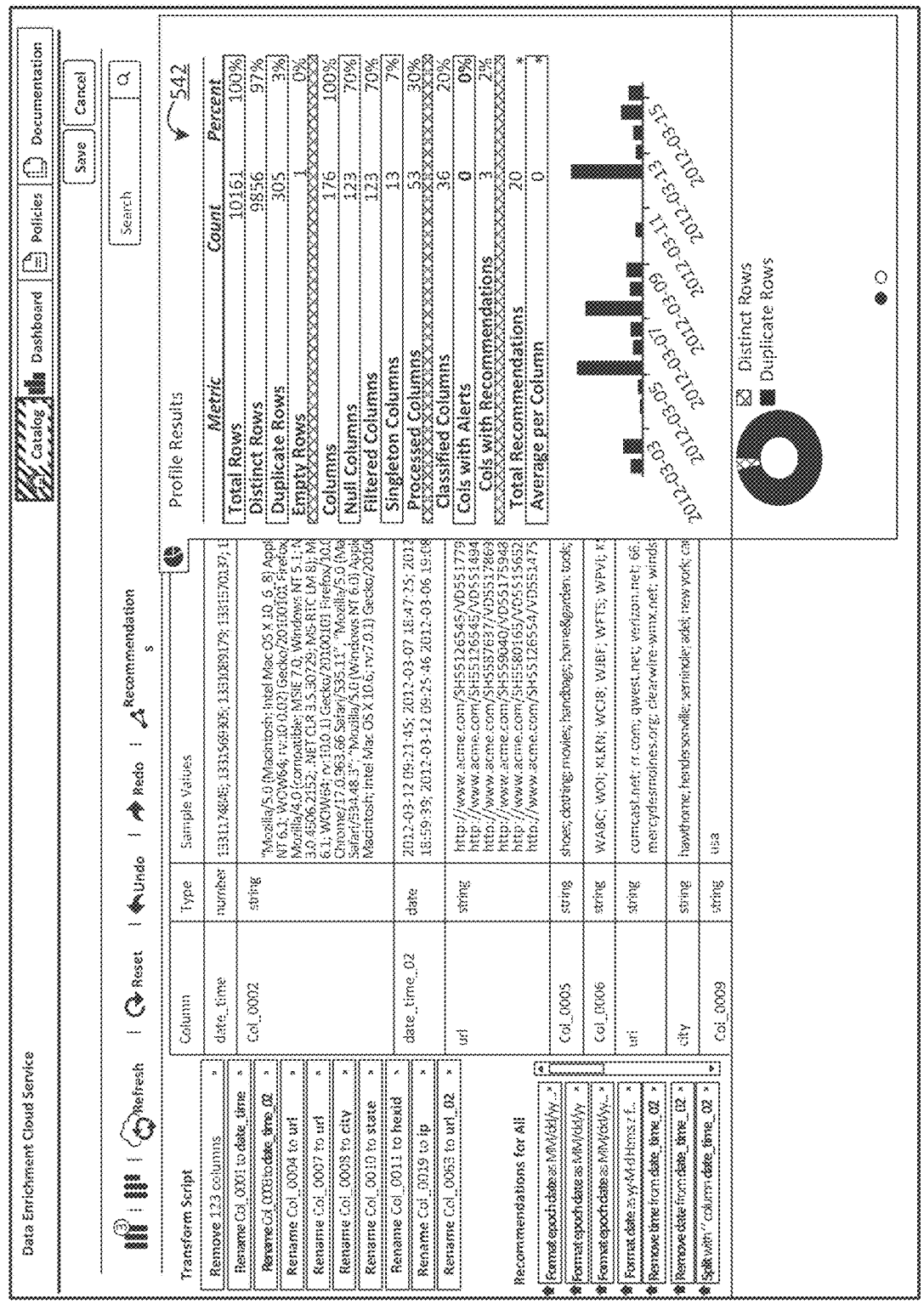
Figure 5C:
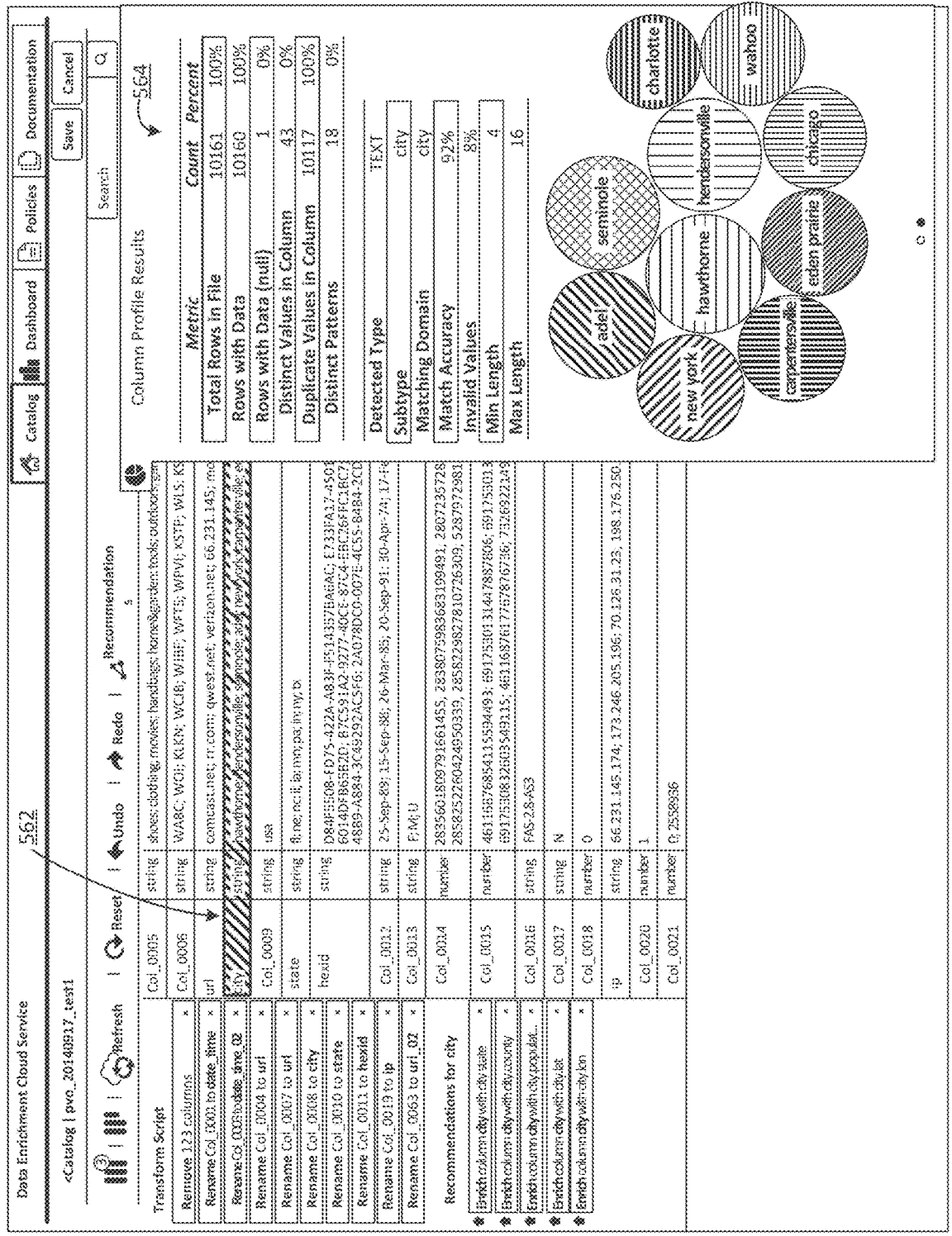
Figure 5D:
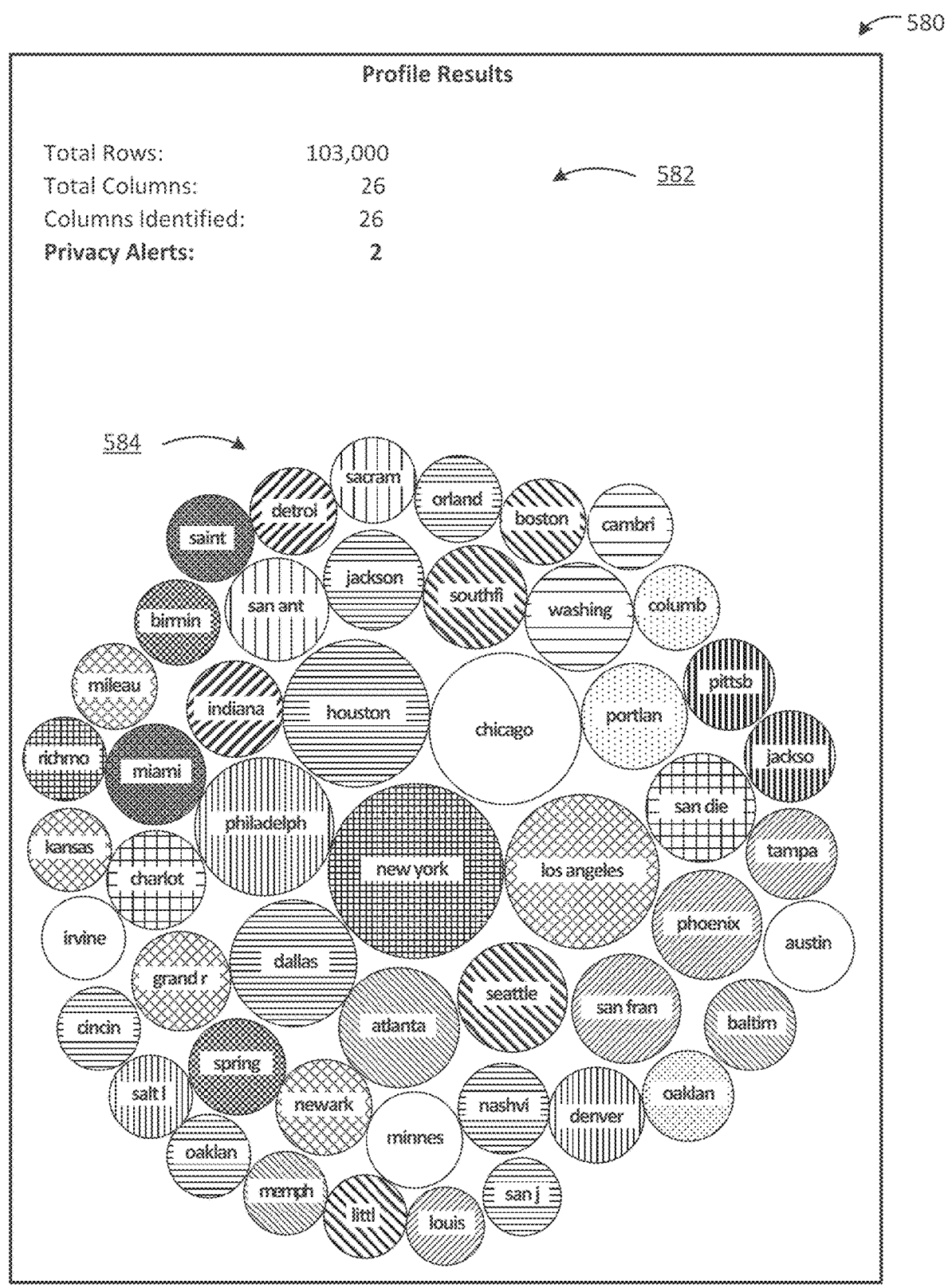

FIGS. 5B, 5C, and 5D show examples of results of interactive data enrichment for data sets. FIG. 5B shows a user interface 540 that can include a profile metric panel 542. Panel 542 can show a summary of metrics associated with the selected data source. In some embodiments, as shown in FIG. 5C, a profile metric panel 560 can include metrics for a particular column 562, instead of an entire data set. For example, the user can select the particular column on the user's client device and the corresponding column profile 564 can be displayed. In this example, the profiler indicates a 92% match of column 0008 with known cities in the knowledge source. A high probability in some embodiments can cause the transform engine to automatically label col_0008 to "city".

FIG. 5D shows a profile metric panel 580 that includes global metrics 582 (e.g., metrics related to an entire dataset), and column-specific visualizations 584. The column specific visualizations 584 can be selected by a user and/or used to navigate the data (e.g., by clicking, dragging, swiping, etc.). The examples described above represent simplified transforms to small data sets. Similar and more complex processing can also be applied automatically to large data sets comprising billions of records.

Some embodiments herein, such as those described with reference to FIGS. 6-11, may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to FIGS. 6-11, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by a computing system of a data enrichment service, e.g., data enrichment service 302. The particular series of processing steps in this disclosure are not intended to be limiting. Other sequences of steps may also be performed according to alternative embodiments. For example, alternative embodiments of the present invention may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in FIGS. 6-11 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

Figure 6:
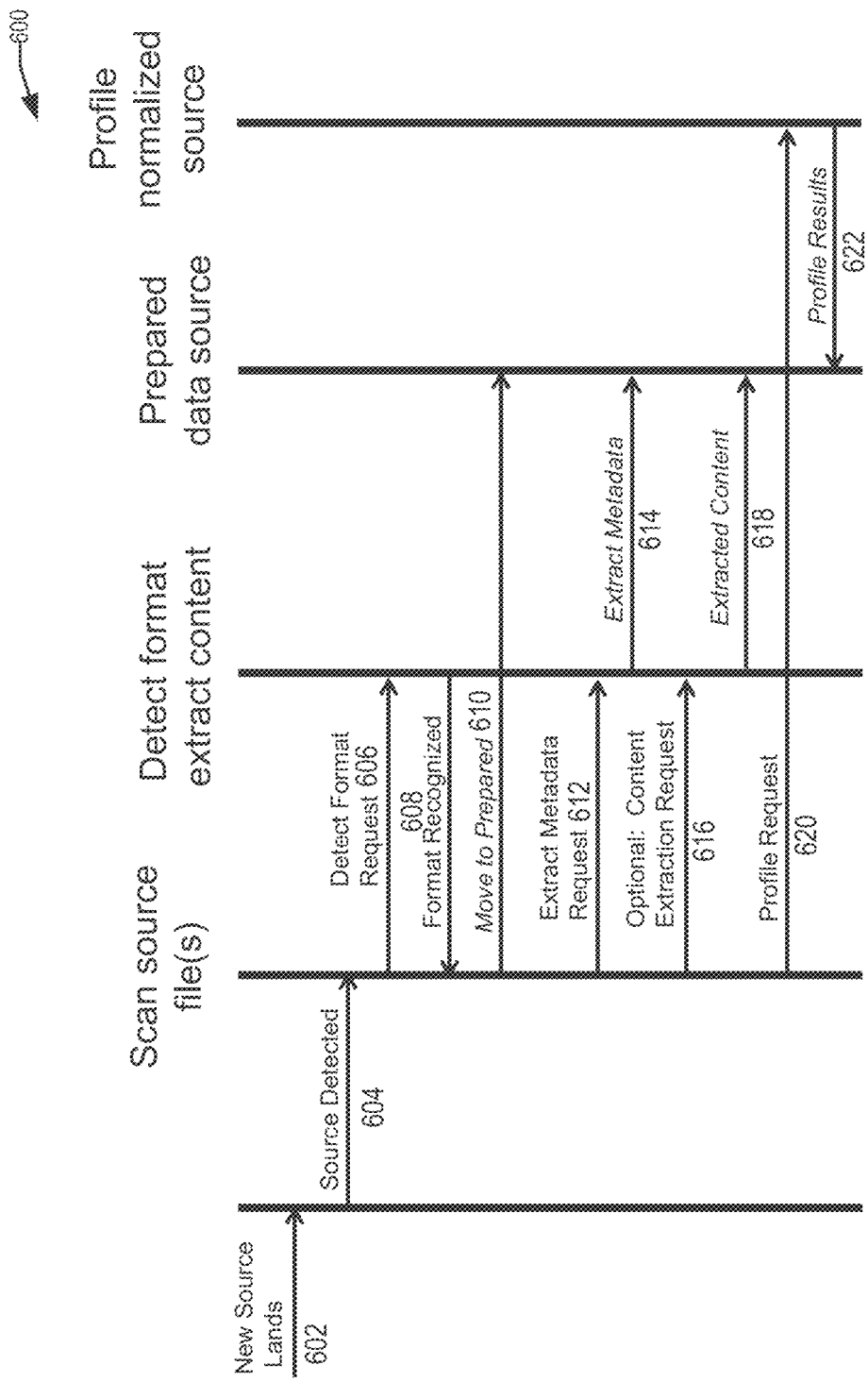
FIG. 6 illustrates a sequence diagram of a process for data enrichment, in accordance with an embodiment of the present invention.

Now turning to FIG. 6, a sequence diagram of a process 600 for data enrichment is illustrated, in accordance with an embodiment of the present invention. Process 600 can be implemented by data enrichment service 302 of FIG. 3B.

As shown in FIG. 6, process 600 may begin at step 602 by a new data source becoming accessible (e.g., "New Source Lands") to data enrichment service 302. For example, communication may be established between the new data source and data enrichment service 302. At step 604, upon a new data source becoming accessible, data enrichment service 302 can detect the new data source. In some embodiments, a user may interact with an interface of data enrichment service 302 to provide input indicating information to identify one or more data sources that become accessible. The information may specify a data source for input. In some embodiments, the new data source can be registered with the data enrichment service 302.

At step 606, data enrichment service can request that a format of data provided by the new data source be detected. At step 608, one or more formats may be recognized in the data sets accessible from the new data source. The formats may be identified to determine whether the formats need to be normalized to a format for processing by data enrichment service 302. Upon determining that the format of data provided by the new data source is to be normalized, the data is prepared for further processing by data enrichment service 302 at step 610.

Once data is prepared, at step 612, data enrichment service 302 can request metadata to be extracted based on the formatted detected. Data enrichment service 302 may, at step 614, extract metadata from the data. Data enrichment service 302 may optionally request content to be extracted from the data at step 616. The data may be processed to extract data source content at step 618. The metadata and the content can converted to a new data set by normalizing the metadata and content, if extracted. Data may be normalized by applying techniques described herein. The normalized content and metadata can then be stored in a temporary distributed storage system 305. Data management service 302 can process the normalized data to determine a profile at step 620. A profile of the data may be determined applying techniques described herein. Results of profiling may be provided for display at step 622.

Figure 7:
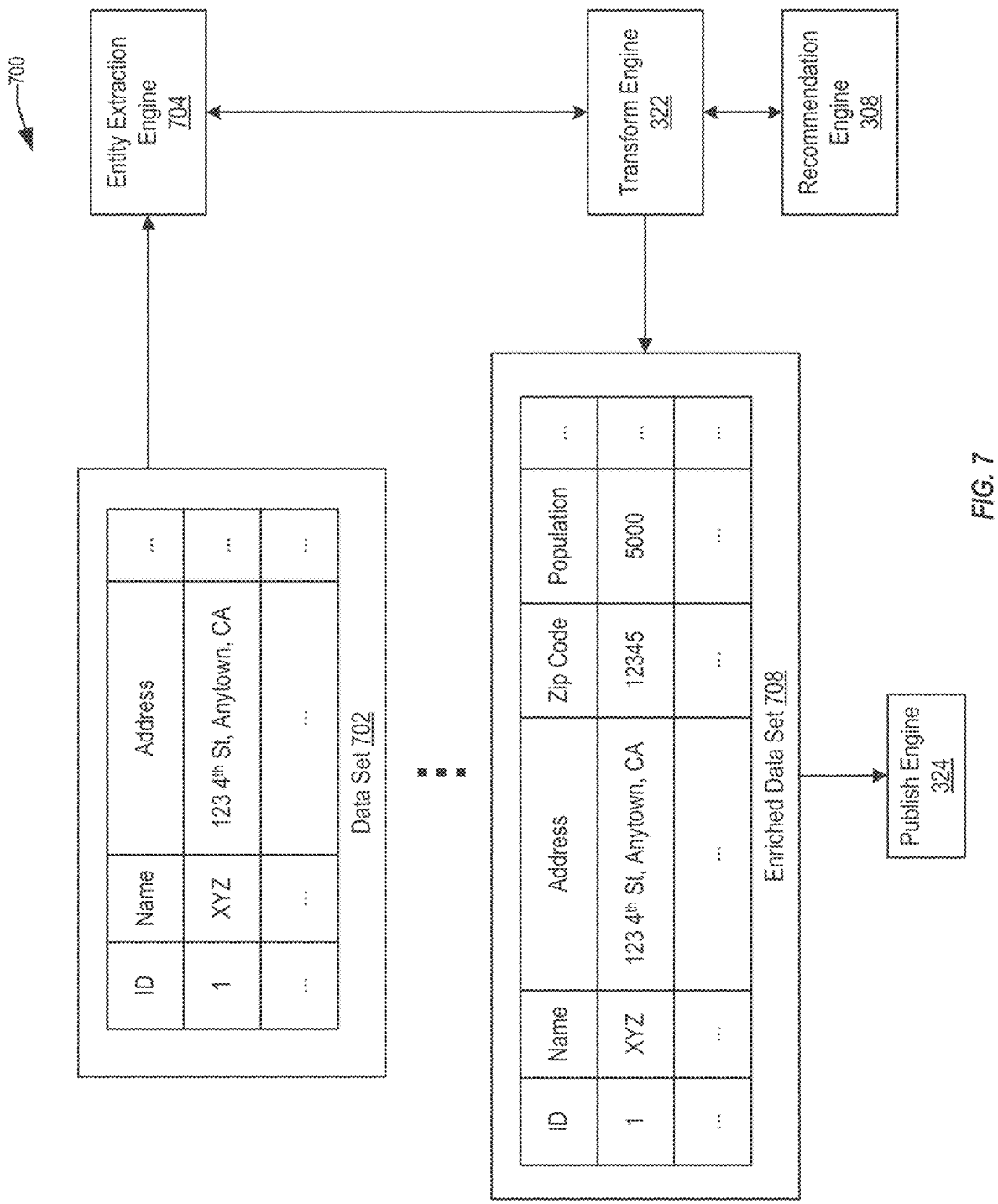
FIG. 7 depicts a simplified diagram of a process for entity extraction and data enrichment, in accordance with an embodiment of the present invention.

FIG. 7 depicts a simplified diagram of a process 700 for entity extraction and data enrichment, in accordance with an embodiment of the present invention. As shown in FIG. 7, a data set 702 can be received, which includes data having a format (e.g., a tabular format). Data set 702 may be in a format having columns such as identifier (ID), name, and address. Although three columns have identified names, this example is not limiting and is presented for simplicity of explanation. In some embodiments, one or more columns can be unlabeled and a label can be recommended by data enrichment service 302.

In some embodiments, data enrichment service 302 can analyze data set 702 to identify and extract entity information for a set of entities (e.g., people, places, things, organizations, etc.) stored in data set 702. Data enrichment service 302 may include entity extraction engine 704. Entity extraction engine 704 can be part of profile engine 326, transform engine 322, or as a stand-alone engine in data enrichment service 302. In some embodiments, metadata about the extracted entities can be captured and made available for publishing as additional enriched data columns. For example, metadata may be published for display at user interface 306. Examples of metadata publishing are described below with reference to FIGS. 8A and 8B.

In some embodiments, entity extraction engine 704 can perform extraction based on analyzing the semantic meaning of data. The semantic meaning of data may be determined using techniques described herein, such as those performed by knowledge service 310. Techniques may include analyzing data to perform similarity matching. For example, data set 702 may be compared to one or more data sets from one or more knowledge sources 340 using similarity analysis. Knowledge service may calculate a similarity metric to determine the semantic similarity of data set 702 to one or more data sets from a knowledge source 340. Based on identifying a data set in a knowledge source that is similar to data set 702, data set 702 can be augmented (e.g., enriched) with data from the knowledge source.

In at least one example, entity extraction engine 704 can identify entity information (e.g., address information stored in the address column) and identify data related to entity information using, e.g., knowledge service 340. As shown in FIG. 7, the transform engine 322 can join new columns Zip Code and Population to data set 602 when forming enriched data set 708. The enriched data set 708 can then be passed to publish engine 324 to be pushed to one or more data targets 330.

Figure 8A:
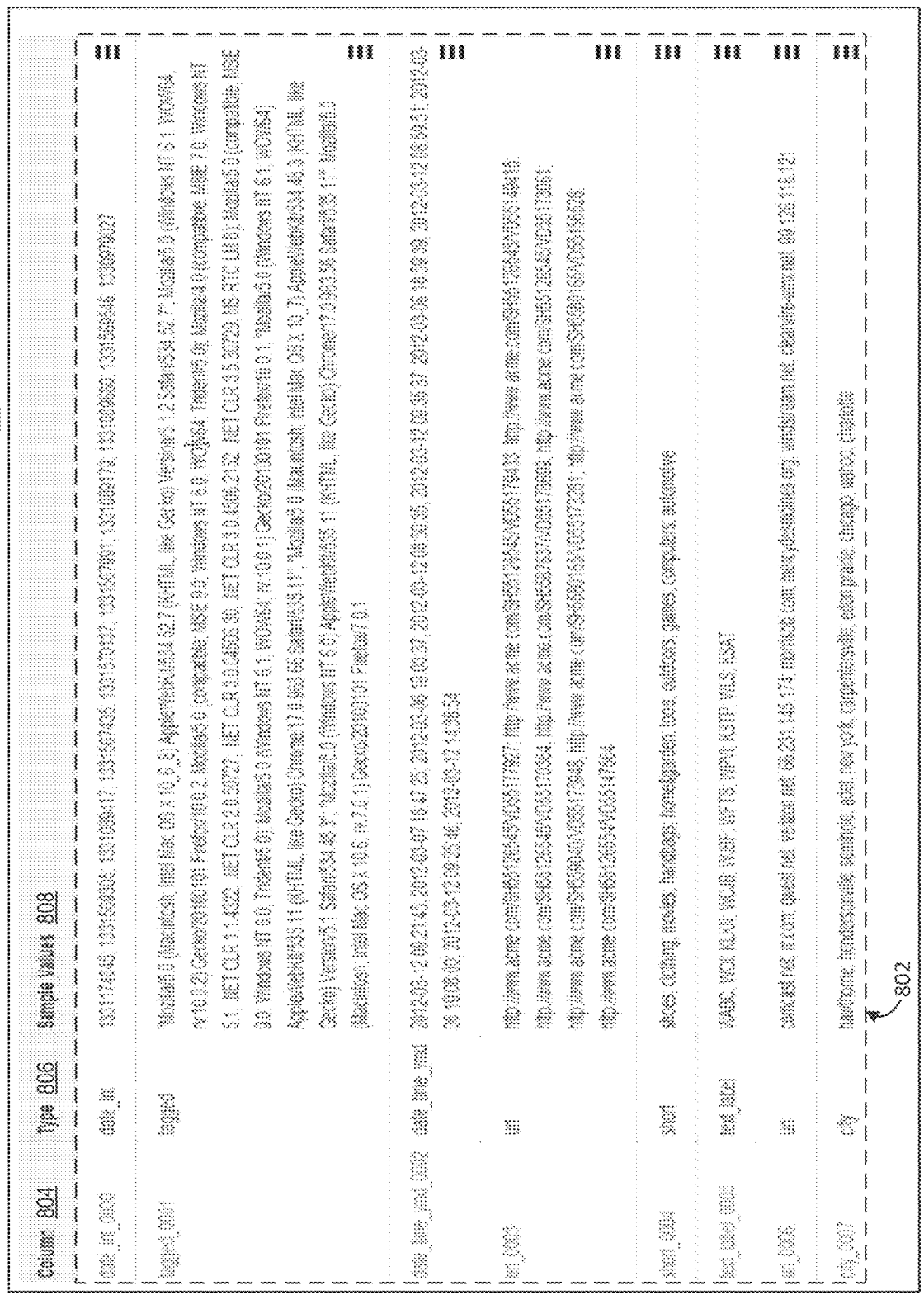
FIGS. 8A and 8B depict various user interfaces of data ingested from one or more data sources, in accordance with an embodiment of the present invention.
Figure 8B:
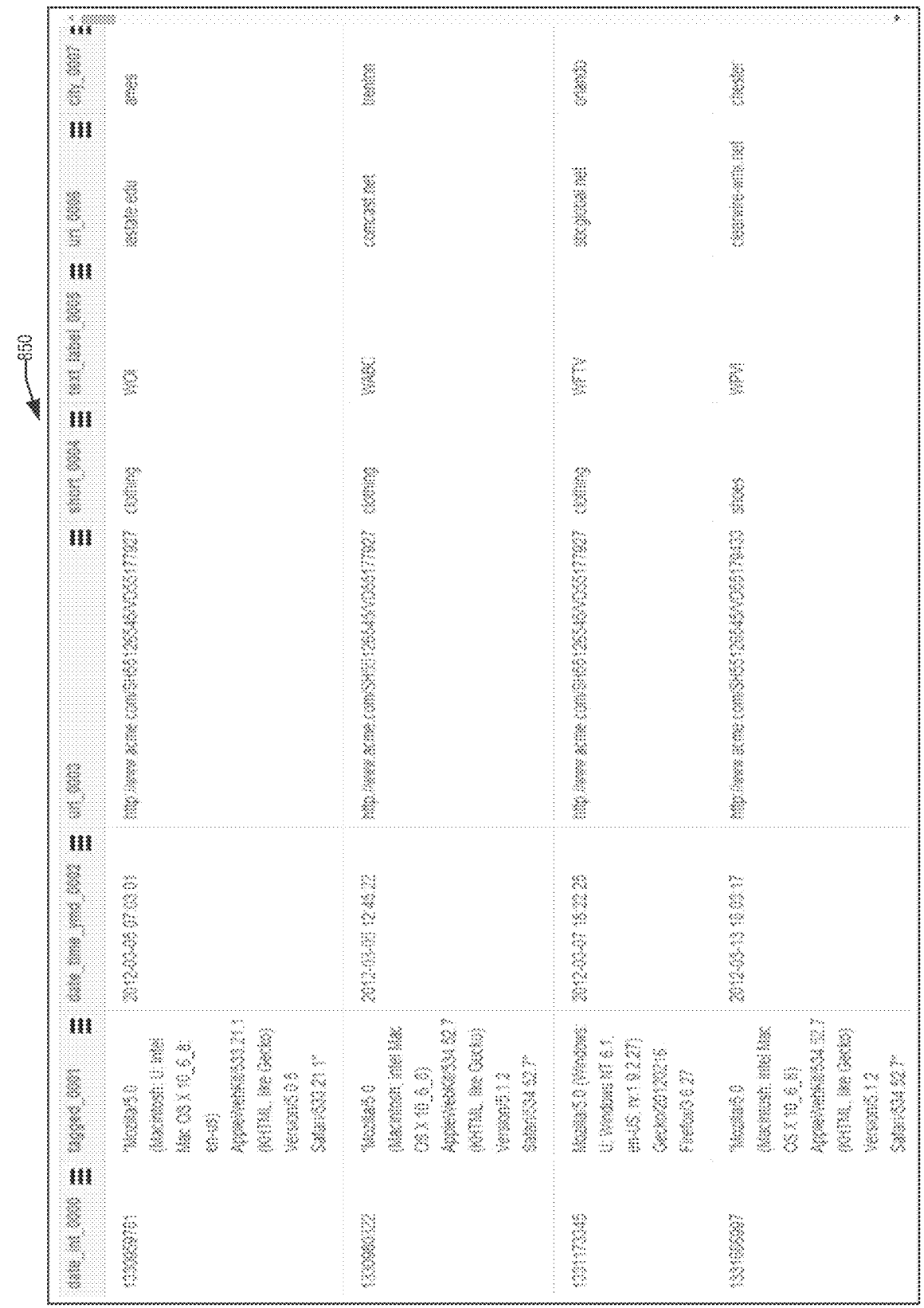

FIGS. 8A and 8B depict various user interfaces of data ingested from one or more data sources, in accordance with an embodiment of the present invention. Specifically, the user interfaces may be displayed by user interface 306 or any one of clients 304. GUI 800 in FIG. 8A shows a default view of data after initial ingestion by data enrichment service 302. The default view may provide a graphical visualization of metadata 802 about data ingested from one or more data sources. Metadata 802 may be determined by performing one or more processes described herein. For example, metadata 802 may be determined by extracting information from data ingested by data enrichment service 302. The default view of GUI 800 provides a user of data enrichment service 302 with a high level view of the ingested data.

In some embodiments, metadata 802 may include additional data determined by enriching data ingested by data enrichment service 302. For example, metadata 802 may be displayed in GUI 800 based on performing the process described with reference to FIG. 11. In the example shown in FIG. 8A, metadata 802 may display columns 804 (or suggested names) that represents a category (e.g., a classification) for an attribute of data for each entity in the data ingested by data enrichment service 302. Metadata 802 in each row displayed in GUI 800 may correspond to a different entity in the ingested data. The category represented by column 804 may represent a discovered type or classification of an attribute of an entity corresponding to each row of data in the ingested data. Each row of data in metadata 802 may include a value 808 (e.g., Sample Values) corresponding to an attribute type 806 (e.g., Type). GUI 800 provides a user with enrichment by displaying a high level view of data ingested from a data source.

GUI 850 in FIG. 8B shows a customized view of metadata 802 shown in GUI 800. GUI 850 may be displayed in alternative or in addition to GUI 800. GUI 850 may be displayed based on input received from interaction with GUI 800. GUI 850 may display metadata 852, which is a different view of all or some of metadata 802. For example, GUI 850 displays metadata 852, which is a tabular form for metadata 802. GUI 850 may display metadata 852 as the actual contents of metadata 802. A GUI, such as GUI 850 may enable a user to view specific rows and/or columns in the ingested data as transformations are performed. GUI 800 may include one or more interactive elements to change a presentation of metadata 802, to a view such as GUI 850. In the example shown in FIG. 8B, metadata 852 is displayed in GUI 850 with each row including a value for each of columns 802 displayed in GUI 800.

Figure 9:
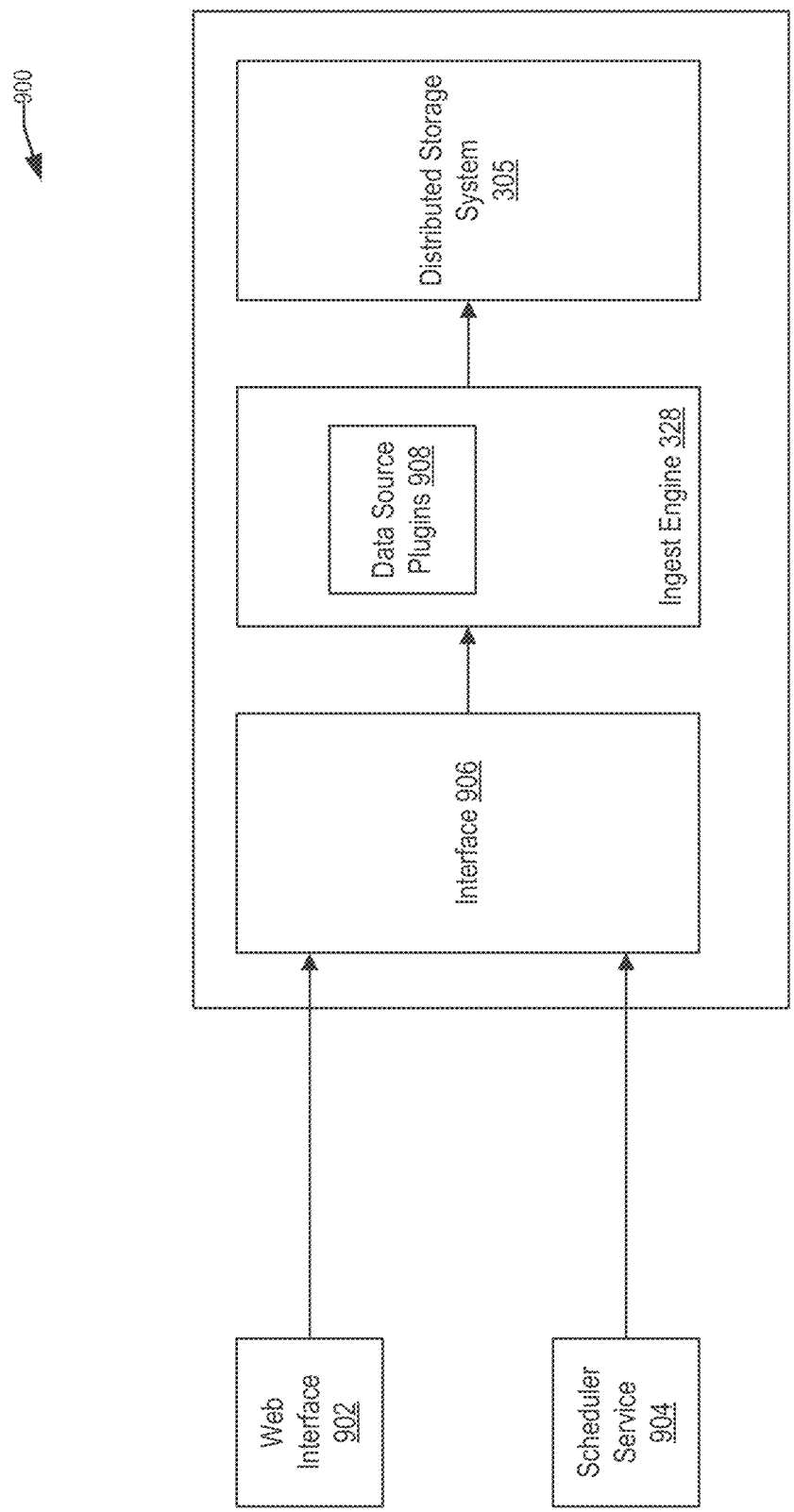
FIG. 9 depicts a simplified diagram of a data ingestion system, in accordance with an embodiment of the present invention.

FIG. 9 depicts a simplified diagram of a data ingestion system 900, in accordance with an embodiment of the present invention. Data ingestion system 900 can be implemented using one or more of elements of data enrichment service 302. As shown in FIG. 9, ingest engine 328 of data enrichment service 302 can identify one or more data sources to be ingested through an interface 906. Interface 906 may have an application programming interface (API). Requests for ingestion can be received through a web interface 902 or through a scheduler service 904. Ingest engine 328 can include one or more data source plugins 908 enabling ingest engine 328 to obtain one or more data sets from a data source. Ingest engine 328 can be extensible and additional plugins can be added to support new types of data sources. In some embodiments, ingest engine 328 can provide metrics about the ingestion process, such as a number of files ingested, size of the ingested content, and time taken for uploading. Once data is ingested, ingestion engine 328 can store the ingested content and/or metadata in a distributed storage system (e.g., distributed storage system 305) temporarily, while the content and/or metadata is processed prior to being published.

Figure 10:
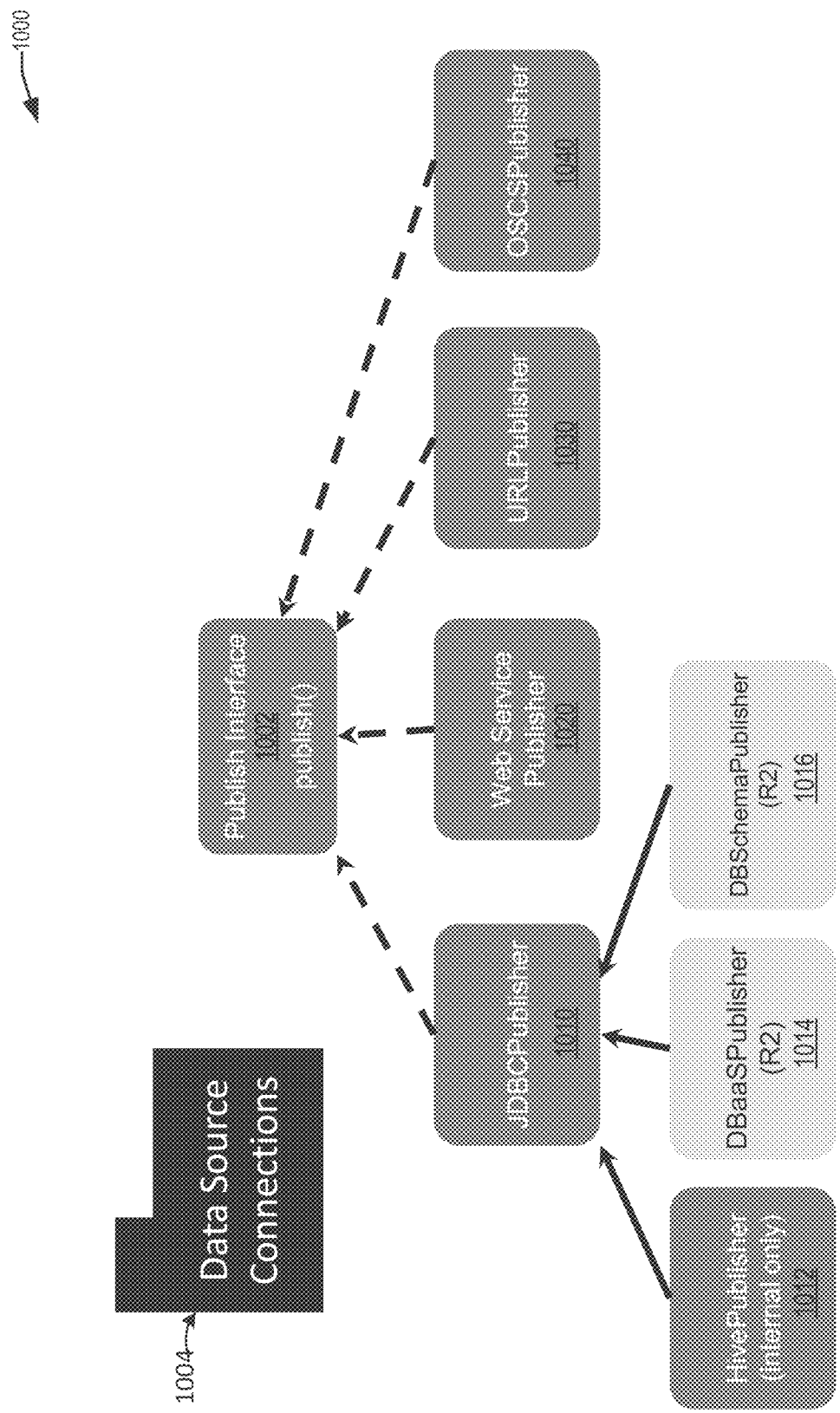
FIG. 10 depicts a simplified block diagram illustrating a publishing system, in accordance with an embodiment of the present invention.

FIG. 10 depicts a simplified block diagram illustrating a publishing system 1000, in accordance with an embodiment of the present invention. Specifically, publishing system 1000 illustrates interface modules that can be implemented for publish engine 324. In some embodiments, publish engine 324 may include a publish interface 1002 that communicates with different data sources via data source connections 1004. For example, publish interface 1002 may include a Java® database connectivity (JDBC) Publisher interface 1010, a Web Service publisher 1020, a URL Publisher 1030, and an OSCS Publisher 1040. JDBC Publisher interface 1010 may be configured to communicate with various database-specific publishing interfaces (e.g., HivePublisher 1012, DBaaSPublisher 1014, or DBSchemaPublisher 1016). Web Service Publisher interface 1020 may be configured to communicate with different Web Service publishing interfaces. URL Publisher interface 1030 may be configured to communicate with different URL publishing interfaces. OSCS Publisher interface 1040 may be configured to communicate with different solution center publishing interfaces. The publish interfaces can implement different data source specific methods or other operations to download the transformed data and metadata to the one or more data targets.

Figure 11:
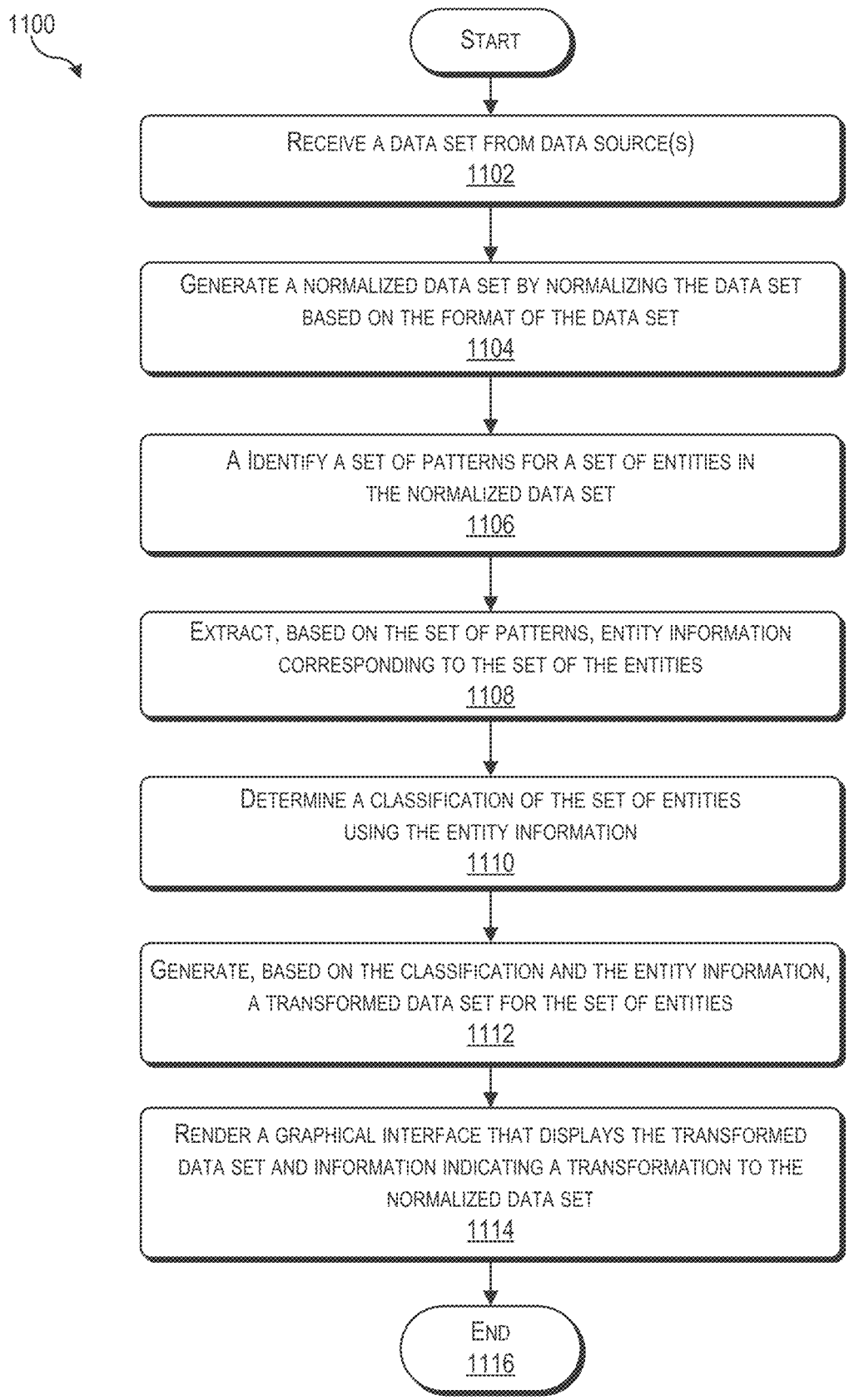
FIG. 11 depicts a flowchart of a process of data enrichment, in accordance with some embodiments of the present invention.

FIG. 11 illustrates a flowchart 1100 of a process for data enrichment, according to an embodiment of the present invention. The process may be implemented to enrich a data set obtained from one or more sources. The process may include implementing techniques to identify related entities in data obtained from a data source, and to determine a classification for those entities. The data can be enriched based on the classification of those entities. In some embodiments, a graphical user interface may be rendered that displays recommendations for augmenting data based on the classification. The graphical user interface may be configured to receive input enabling a user to selectively choose one or more of the recommendations to enrich the data set received from a data source.

The process depicted by flowchart 1100 may begin at step 1102 by receiving a data set from one or more data sources. At step 1104, the data set may be normalized. A normalized data set may be created by normalizing the data set received from one or more data sources. The normalized data set may be generated based on the result of normalizing a data set. Normalizing a data set mat include converting raw data in the data set into a format that is processable. For example, normalizing the data set to create the normalized data set includes modifying the data set having the format to an adjusted format of the normalized data set, the adjusted format being different from the format. A data set may be normalized by identifying one or more columns of data in the data set, and modifying a format of the data corresponding to the columns to the same format. For example, data having different formatted dates in a data set may be normalized by changing the formats to a common format for the dates. In some embodiments, data in the data set may be normalized by modifying the data to a common format.

At step 1106, a set of patterns for a set of entities may be identified in a normalized data set. One or more patterns may be identified by parsing the normalized data for an attribute in the normalized data. The set of entities may correspond to the normalized data having the attribute. In one example, identifying the one or more patterns includes comparing column data amongst a plurality of columns in the normalized data set, and determining that each of a set of columns in the plurality of columns has an attribute. In this example, the one or more patterns for the set of entities is identified based on the normalized data for each column having the attribute.

In some embodiments, a set of pattern metrics may be computed. Each of the set of pattern metrics may be computed for a different pattern in the set of patterns. The set of patterns may include a plurality of different patterns identified for the set of entities. A difference may be determined amongst the set of pattern metrics. Based on the difference amongst the set of pattern metrics, a pattern in the set of patterns can be selected. The classification may be determined based on the selected pattern.

In some embodiments, text data may be identified in the normalized data set. The text data may correspond to each entity of the set of entities. A set of classifications may be determined for the set of entities. A set of classification metrics may be computed. Each of the set of classification metrics may be computed for a different classification in the set of classifications. The classification may be determined based on determining a difference amongst the set of classifications.

At step 1108, entity information corresponding to a set of entities in the normalized data set may be extracted. The entity information may be extracted for the set of entities based on the set of patterns that are identified. For example, the normalized data set may be processed to extract data corresponding to the set of entities. The data may include the entity information. Entity information can be extracted based on a format of the normalized data. The format can be used to determine the boundaries of data corresponding to each of the set of entities. Using the format, the normalized data set can be parsed to extract the entity information for each entity in the set of entities.

At step 1110, a classification of the set of entities may be determined using the entity information. The identified pattern(s) corresponding to the set of entities may indicate a classification for the set of entities. For example, where an identified pattern corresponds to a pattern of a date for the set of entities, the set of entities may be classified with a date attribute for the date in each of the set of entities. The classification may be used to display the normalized data corresponding to the set of entities. For example, in FIG. 8B, metadata 852 corresponding to the entities displayed in GUI 850 may be displayed with a classification (e.g., a column).

Metadata 852 may be displayed according to the classification, where the values for each entity are displayed with respect to the classification.

In some embodiments, a classification of the set of entities may be determined based on a similarity metric. The set of entities in the normalized data set may be compared to one or more reference data sets obtained from a reference source (e.g., knowledge source 340). A similarity metric may be computed for each of the one or more reference data sets. The similarity metric may indicate a measure of similarity of each of the one or more reference data sets in comparison to the set of entities.

At step 1112, a transformed data set may be generated for the set of entities in the normalized data set. The transformed data set may be generated based on the entity information extracted for the set of entities and based on the classification determined for the set of entities. The transformed data set may be created from the normalized data set. For example, a transformed data set may be the normalized data after modification of the set of entities to include metadata for an attribute that indicates the classification. The transformed data set may be generated from the normalized data set by modifying the normalized data set to include data about the classification for the set of entities.

In some embodiments, the transformed data set may be generated based on modifying the normalized data set to associate data for each of the set of entities with the classification. The transformed data set is enriched with the classification for the set of entities.

In some embodiments, an additional graphical interface may be rendered that displays the normalized data, that identifies the entity information, and that indicates the classification. Through the graphical interface, input indicating a selection may be received for the classification. The transformed data set may be generated based on the input by a user indicating that the normalized data set be modified to include the classification.

A graphical interface may be rendered to display the transformed data set and information indicating a transformation to the normalized data set to generate the transformed data set.

Figure 12:
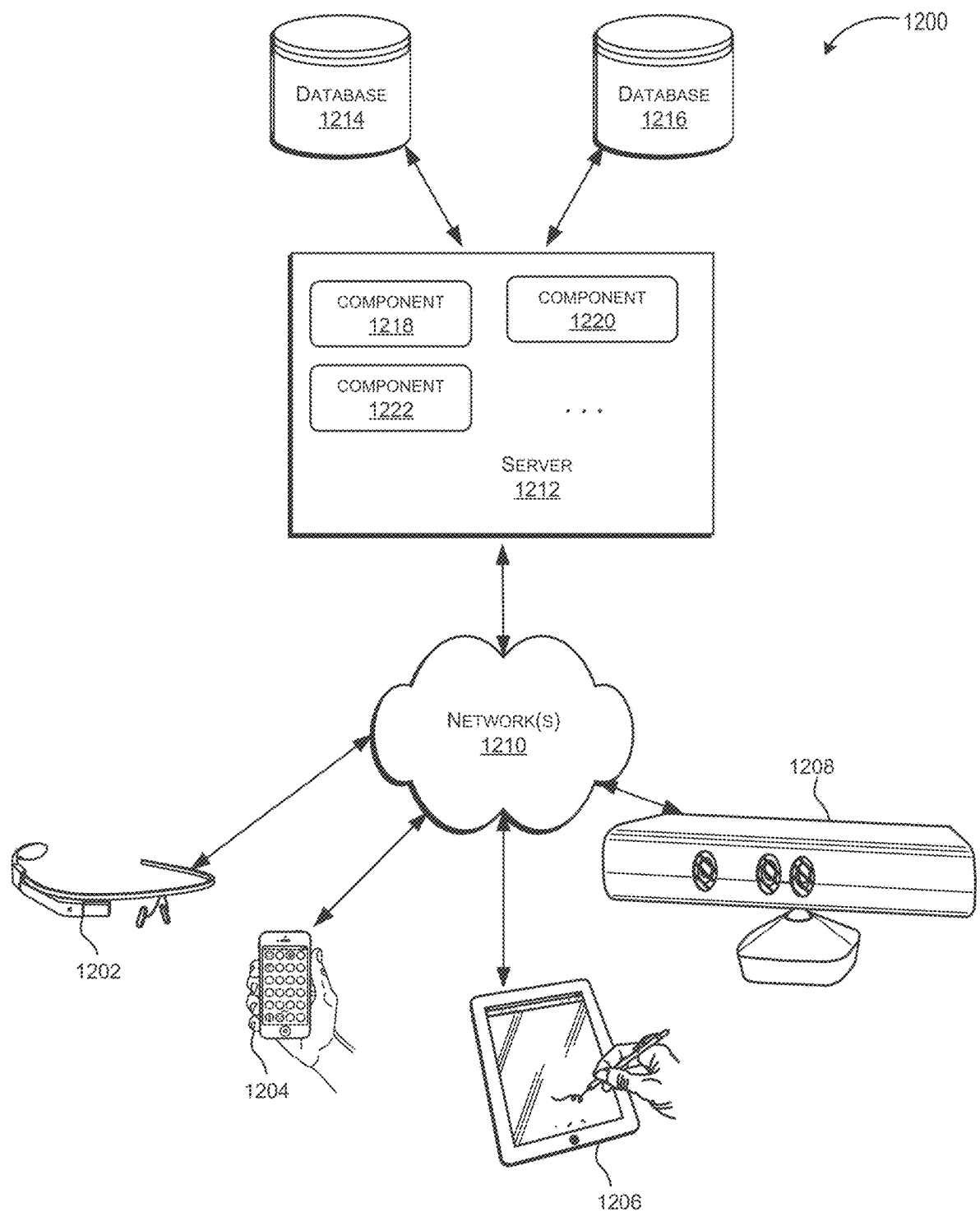
FIG. 12 depicts a simplified diagram of a distributed system for implementing an embodiment.

FIG. 12 depicts a simplified diagram of a distributed system 1200 for implementing an embodiment. In the illustrated embodiment, distributed system 1200 includes one or more client computing devices 1202, 1204, 1206, and 1208, which are configured to execute and operate a client application such as a web browser, proprietary client (e.g., Oracle Forms), or the like over one or more network(s) 1210. Server 1212 may be communicatively coupled with remote client computing devices 1202, 1204, 1206, and 1208 via network 1210.

In various embodiments, server 1212 may be adapted to run one or more services or software applications such as services and applications that provide the document (e.g., webpage) analysis and modification-related processing. In certain embodiments, server 1212 may also provide other services or software applications can include non-virtual and virtual environments. In some embodiments, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in FIG. 12, software components 1218, 1220 and 1222 of system 1200 are shown as being implemented on server 1212. In other embodiments, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in FIG. 12 is thus one example of a distributed system for implementing an embodiment system and is not intended to be limiting.

Client computing devices 1202, 1204, 1206, and/or 1208 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1210.

Although distributed system 1200 in FIG. 12 is shown with four client computing devices, any number of client computing devices may be supported. Other devices, such as devices with sensors, etc., may interact with server 1212.

Network(s) 1210 in distributed system 1200 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1210 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination.

Server 1212 can include one or more virtual machines running virtual operating systems, or other computing architectures involving virtualization. One or more flexible pools of logical storage devices can be virtualized to maintain virtual storage devices for the server. Virtual networks can be controlled by server 1212 using software defined networking. In various embodiments, server 1212 may be adapted to run one or more services or software applications described in the foregoing disclosure. For example, server 1212 may correspond to a server for performing processing as described above according to an embodiment of the present disclosure.

Server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more databases 1214 and 1216. These databases may provide a mechanism for storing information such as user interactions information, usage patterns information, adaptation rules information, and other information used by embodiments of the present invention. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of embodiments, databases 1214 and 1216 may reside in a storage-area network (SAN). Similarly, any necessary files for performing the functions attributed to server 1212 may be stored locally on server 1212 and/or remotely, as appropriate. In one set of embodiments, databases 1214 and 1216 may include relational databases, such as databases provided by Oracle, that are adapted to store, update, and retrieve data in response to SQL-formatted commands.

Figure 13:
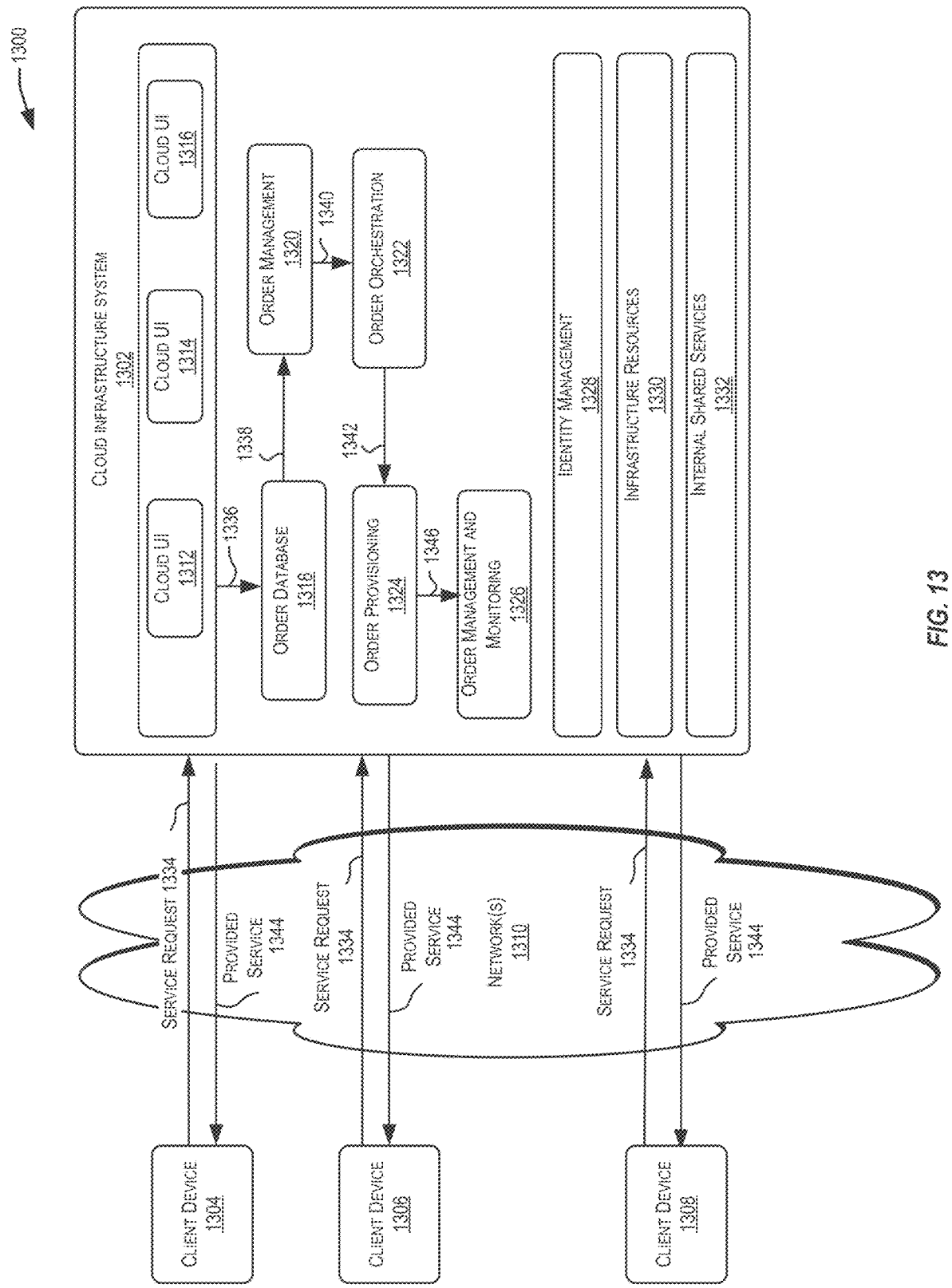
FIG. 13 is a simplified block diagram of one or more components of a system environment in which services may be offered as cloud services, in accordance with an embodiment of the present disclosure.

In some embodiments, the document analysis and modification services described above may be offered as services via a cloud environment. FIG. 13 is a simplified block diagram of one or more components of a system environment 1300 in which services may be offered as cloud services, in accordance with an embodiment of the present disclosure. In the illustrated embodiment in FIG. 13, system environment 1300 includes one or more client computing devices 1304, 1306, and 1308 that may be used by users to interact with a cloud infrastructure system 1302 that provides cloud services, including services for dynamically modifying documents (e.g., webpages) responsive to usage patterns. Cloud infrastructure system 1302 may comprise one or more computers and/or servers that may include those described above for server 1312.

It should be appreciated that cloud infrastructure system 1302 depicted in FIG. 13 may have other components than those depicted. Further, the embodiment shown in FIG. 13 is only one example of a cloud infrastructure system that may incorporate an embodiment of the invention. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1202, 1204, 1206, and 1208. Client computing devices 1304, 1306, and 1308 may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302. Although exemplary system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 1310.

In certain embodiments, services provided by cloud infrastructure system 1302 may include a host of services that are made available to users of the cloud infrastructure system on demand. In addition to services related to dynamic document modification responsive usage patterns, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1302 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1302 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle Corporation) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1302 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1302 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform, and other resources.

In some embodiments, resources in cloud infrastructure system 1302 may be shared by multiple users and dynamically re-allocated per demand. Additionally, resources may be allocated to users in different time zones. For example, cloud infrastructure system 1302 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 to enable provision of services by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in FIG. 13, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In an exemplary operation, at 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI) such as cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

At 1336, the order information received from the customer may be stored in an order database 1318. If this is a new order, a new record may be created for the order. In one embodiment, order database 1318 can be one of several databases operated by cloud infrastructure system 1318 and operated in conjunction with other system elements.

At 1338, the order information may be forwarded to an order management module 1320 that may be configured to perform billing and accounting functions related to the order, such as verifying the order, and upon verification, booking the order.

At 1340, information regarding the order may be communicated to an order orchestration module 1322 that is configured to orchestrate the provisioning of services and resources for the order placed by the customer. In some instances, order orchestration module 1322 may use the services of order provisioning module 1324 for the provisioning. In certain embodiments, order orchestration module 1322 enables the management of business processes associated with each order and applies business logic to determine whether an order should proceed to provisioning.

As shown in the embodiment depicted in FIG. 13, at 1342, upon receiving an order for a new subscription, order orchestration module 1322 sends a request to order provisioning module 1324 to allocate resources and configure resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. This enables order orchestration module 1322 to be isolated from implementation details, such as whether or not services and resources are actually provisioned on the fly or pre-provisioned and only allocated/assigned upon request.

At 1344, once the services and resources are provisioned, a notification may be sent to the subscribing customers indicating that the requested service is now ready for use. In some instance, information (e.g., a link) may be sent to the customer that enables the customer to start using the requested services.

At 1346, a customer's subscription order may be managed and tracked by an order management and monitoring module 1326. In some instances, order management and monitoring module 1326 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1300 may include an identity management module 1328 that is configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

Figure 14:
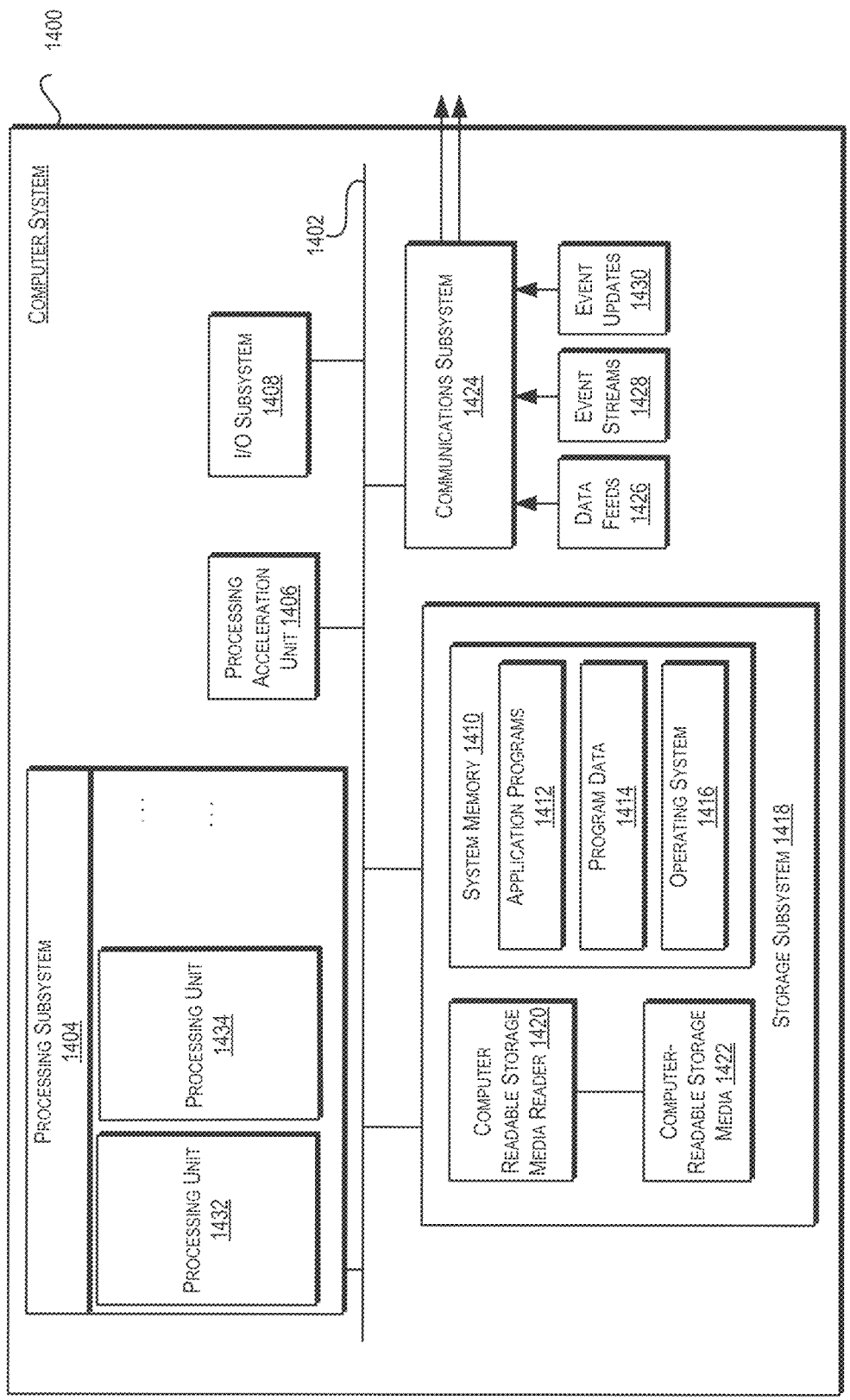
FIG. 14 illustrates an exemplary computer system that may be used to implement an embodiment of the present invention.

FIG. 14 illustrates an exemplary computer system 1300 that may be used to implement an embodiment of the present invention. In some embodiments, computer system 1400 may be used to implement any of the various servers and computer systems described above. As shown in FIG. 14, computer system 1400 includes various subsystems including a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 may include tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1404 controls the operation of computer system 1400 and may comprise one or more processing units 1432, 1434, etc. A processing unit may include be one or more processors, including single core or multicore processors, one or more cores of processors, or combinations thereof. In some embodiments, processing subsystem 1404 can include one or more special purpose co-processors such as graphics processors, digital signal processors (DSPs), or the like. In some embodiments, some or all of the processing units of processing subsystem 1404 can be implemented using customized circuits, such as application specific integrated circuits (ASICs), or field programmable gate arrays (FPGAs).

In some embodiments, the processing units in processing subsystem 1404 can execute instructions stored in system memory 1410 or on computer readable storage media 1422. In various embodiments, the processing units can execute a variety of programs or code instructions and can maintain multiple concurrently executing programs or processes. At any given time, some or all of the program code to be executed can be resident in system memory 1410 and/or on computer-readable storage media 1422 including potentially on one or more storage devices. Through suitable programming, processing subsystem 1404 can provide various functionalities described above for dynamically modifying documents (e.g., webpages) responsive to usage patterns.

In certain embodiments, a processing acceleration unit 1406 may be provided for performing customized processing or for off-loading some of the processing performed by processing subsystem 1404 so as to accelerate the overall processing performed by computer system 1400.

I/O subsystem 1408 may include devices and mechanisms for inputting information to computer system 1400 and/or for outputting information from or via computer system 1400. In general, use of the term "input device" is intended to include all possible types of devices and mechanisms for inputting information to computer system 1400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1418 provides a repository or data store for storing information that is used by computer system 1400. Storage subsystem 1418 provides a tangible non-transitory computer-readable storage medium for storing the basic programming and data constructs that provide the functionality of some embodiments. Software (programs, code modules, instructions) that when executed by processing subsystem 1404 provide the functionality described above may be stored in storage subsystem 1418. The software may be executed by one or more processing units of processing subsystem 1404. Storage subsystem 1418 may also provide a repository for storing data used in accordance with the present invention.

Storage subsystem 1418 may include one or more non-transitory memory devices, including volatile and non-volatile memory devices. As shown in FIG. 14, storage subsystem 1418 includes a system memory 1410 and a computer-readable storage media 1422. System memory 1410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1400, such as during start-up, may typically be stored in the ROM. The RAM typically contains data and/or program modules that are presently being operated and executed by processing subsystem 1404. In some implementations, system memory 1410 may include multiple different types of memory, such as static random access memory (SRAM) or dynamic random access memory (DRAM).

By way of example, and not limitation, as depicted in FIG. 14, system memory 1410 may store application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1422 may store programming and data constructs that provide the functionality of some embodiments. Software (programs, code modules, instructions) that when executed by processing subsystem 1404 a processor provide the functionality described above may be stored in storage subsystem 1418. By way of example, computer-readable storage media 1422 may include non-volatile memory such as a hard disk drive, a magnetic disk drive, an optical disk drive such as a CD ROM, DVD, a Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1422 may provide storage of computer-readable instructions, data structures, program modules, and other data for computer system 1400.

In certain embodiments, storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for storing computer-readable information.

In certain embodiments, computer system 1400 may provide support for executing one or more virtual machines. Computer system 1400 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1400. Accordingly, multiple operating systems may potentially be run concurrently by computer system 1400. Each virtual machine generally runs independently of the other virtual machines.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to establish a communication channel to one or more client devices via the Internet for receiving and sending information from and to the client devices.

Communication subsystem 1424 may support both wired and/or wireless communication protocols. For example, in certain embodiments, communications subsystem 1424 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

Communication subsystem 1424 can receive and transmit data in various forms. For example, in some embodiments, communications subsystem 1424 may receive input communication in the form of structured and/or unstructured data feeds 1426, event streams 1428, event updates 1430, and the like. For example, communications subsystem 1424 may be configured to receive (or send) data feeds 1426 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1424 may be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g., network monitoring and traffic management applications), click-stream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1400 depicted in FIG. 14 is intended only as a specific example. Many other configurations having more or fewer components than the system depicted in FIG. 14 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

The data enrichment service described herein may also be referred to as IMI, ODECS, and/or Big Data Prep.

What is claimed is:

1. A method comprising:
receiving, by a computing system, a data set comprising a column of data from one or more data sources, wherein the computing system is a big data system configured to analyze large data sets;
normalizing, by the computing system, the data set comprising the column of data and having a first format to create a normalized data set in a second column of data by modifying the data in the data set to have a common format for data in the normalized data set;
identifying, by the computing system, a set of patterns for a set of entities in the normalized data set in the column of data using a hierarchy of regular expressions, wherein the set of patterns for the set of entities is identified based on a semantic similarity between the set of patterns for the set of entities in the normalized data set and one or more data sets in a knowledge source,
wherein the knowledge source comprises information published by one of a web site, a web service, or a knowledge store;
extracting, by the computing system, based on the identified set of patterns, entity information corresponding to the set of entities from the normalized data set comprising the data set having the common format;
classifying, by the computing system, the set of entities using the entity information in order to obtain a classification for attributes of the set of entities, wherein the classification for the attributes of the set of entities identifies a type of the set of entities in the column of data;
transforming, automatically by the computing system, the data set based on the classification and the entity information by generating a transformed data set comprising classification attribute metadata for the set of entities in the normalized data set in the second column of data;
determining, by the computing system, a transform script comprising a plurality of transformations applied to the normalized data in the column of data to generate the transformed data set;
rendering, by the computing system, a graphical interface that displays the transformed data set and the transform script comprising the plurality of transformations applied to the normalized data set to generate the transformed data set;
receiving, via the graphical interface, an input by a user selecting the transform script comprising the plurality of transformations;
applying the selected transform script to the data set; and
generating the transformed data set based on the selected transform script.

2. The method of claim 1, further comprising:
computing a set of pattern metrics, wherein each of the set of pattern metrics is computed for a different pattern in the set of patterns, and wherein the set of patterns includes a plurality of different patterns identified for the set of entities;
determining a difference amongst the set of pattern metrics; and
selecting, based on the difference amongst the set of pattern metrics, a pattern in the set of patterns, wherein the classification is determined based on the selected pattern.

3. The method of claim 1, further comprising:
identifying text data in the normalized data set, the text data corresponding to each entity of the set of entities;
determining a set of classifications for the set of entities; and
computing a set of classification metrics, each of the set of classification metrics computed for a different classification in the set of classifications; and
wherein the classification is determined based on determining a difference amongst the set of classifications.

4. The method of claim 1, wherein normalizing the data set to create the normalized data set includes modifying the data set having the first format to an adjusted format of the normalized data set, the adjusted format being different from the first format.

5. The method of claim 1, wherein identifying the set of patterns includes comparing column data amongst a plurality of columns in the normalized data set, and determining that each of a set of columns in the plurality of columns has an attribute, and wherein the set of patterns for the set of entities is identified based on the normalized data for each column having the attribute.

6. The method of claim 1, wherein the transformed data set may be generated from the normalized data set by modifying the normalized data set to include data about the classification for the set of entities.

7. The method of claim 1, further comprising:
rendering, by the computing system, an additional graphical interface that displays the normalized data, that identifies the entity information, and that indicates the classification; and
receiving an input indicating selection of the classification in the additional graphical interface,
wherein the transformed data set is generated upon receiving the input.

8. The method according to claim 1, wherein the data set comprises a plurality of columns of data.

9. The method according to claim 1, wherein the graphical interface is an interactive graphical interface.

10. The method according to claim 1, wherein the graphical interface displays the transformed data set and information indicating a recommended transformation to the normalized data set.

11. The method according to claim 10, wherein the recommended transformation is performed in accordance with a user input on the graphical interface.

12. The method according to claim 1, wherein the classification comprises classifying the set of entities into one or more matching domains in accordance with a similarity score.

13. The method according to claim 1, wherein the plurality of transformations in the transform script comprises a plurality of actions, and wherein the plurality of actions comprise one or more of an update action, a split action, a filter action, an edit column action, an extract action, an insert action, a rename action, a sample action, a join action, an export action, an obfuscate action, a data reformat action, a change case action, or a whitelist filter action.

14. A data enrichment system comprising:
a plurality of data sources; and
a cloud computing infrastructure system comprising:
one or more processors communicatively coupled to the plurality of data sources over at least one communication network; and
a memory coupled to the one or more processors, the memory storing instructions to provide a data enrichment service, wherein the data enrichment system is a big data system configured to analyze large data sets, wherein the instructions, when executed by the one or more processors, cause the one or more processors to:
receive a data set comprising a column of data from one or more data sources of the plurality of data sources;
normalize the data set to create a normalized data set comprising the column of data and having a first format by modifying the data in the data set in a second column of data to have a common format for data in the normalized data set;
identify a set of patterns for a set of entities in the normalized data set in the column of data using a hierarchy of regular expressions, wherein the set of patterns for the set of entities is identified based on a semantic similarity between the set of patterns for the set of entities in the normalized data set and one or more data sets in a knowledge source,
wherein the knowledge source comprises information published by one of a web site, a web service, or a knowledge store;
extract, based on the identified set of patterns, entity information corresponding to the set of entities from the normalized data set comprising the data set having the common format;
classify the set of entities using the entity information in order to obtain a classification for attributes of the set of entities, wherein the classification for the attributes of the set of entities identifies a type of the set of entities in the column of data;
automatically transform the data set based on the classification and the entity information by generating a transformed data set comprising classification attribute metadata for the set of entities in the normalized data set in the second column of data;
determine a transform script comprising a plurality of transformations applied to the normalized data in the column of data to generate the transformed data set; and
render a graphical interface that displays the transformed data set and the transform script comprising the plurality of transformations applied to the normalized data set to generate the transformed data set;
receive, via the graphical interface, an input by a user selecting the transform script comprising the plurality of transformations;
apply the selected transform script to the data set; and
generate the transformed data set based on the selected transform script.

15. The data enrichment system of claim 14, wherein normalizing the data set to create the normalized data includes modifying the data set having the first format to an adjusted format of the normalized data set, the adjusted format being different from the first format.

16. The data enrichment system of claim 14, wherein the instructions, when executed by the one or more processors, further cause the one or more processors to:
compute a set of pattern metrics, wherein each of the set of pattern metrics is computed for a different pattern in the set of patterns, and wherein the set of patterns includes a plurality of different patterns identified for the set of entities;
determine a difference amongst the set of pattern metrics; and
select, based on the difference amongst the set of pattern metrics, a pattern in the set of patterns, wherein the classification is determined based on the selected pattern.

17. The data enrichment system of claim 14, wherein the instructions, when executed by the one or more processors, further cause the one or more processors to:
identify text data in the normalized data set, the text data corresponding to each entity of the set of entities;
determine a set of classifications for the set of entities; and
compute a set of classification metrics, each of the set of classification metrics computed for a different classification in the set of classifications; and
wherein the classification is determined based on determining a difference amongst the set of classifications.

18. The data enrichment system of claim 14, wherein the transformed data set may be generated from the normalized data set by modifying the normalized data set to include data about the classification for the set of entities.

19. The data enrichment system of claim 14, wherein the instructions, when executed by the one or more processors, further cause the one or more processors to:
  render an additional graphical interface that displays the normalized data, that identifies the entity information, and that indicates the classification; and
  receive an input indicating selection of the classification in the additional graphical interface,
  wherein the transformed data set is generated upon receiving the input.

20. A non-transitory computer readable storage medium including instructions stored thereon which, when executed by one or more processors, cause the one or more processors to:
  receive, by a computing system, a data set comprising a column of data from one or more data sources, wherein the computing system is a big data system configured to analyze large data sets;
  normalize, by the computing system, the data set comprising the column of data and having a first format to create a normalized data set in a second column of data by modifying the data in the data set to have a common format for data in the normalized data set;
  identify, by the computing system, a set of patterns for a set of entities in the normalized data set in the column of data using a hierarchy of regular expressions, wherein the set of patterns for the set of entities is identified based on a semantic similarity between the set of patterns for the set of entities in the normalized data set and one or more data sets in a knowledge source,
  wherein the knowledge source comprises information published by one of a web site, a web service, or a knowledge store;
  extract, by the computing system, based on the identified set of patterns, entity information corresponding to the set of entities from the normalized data set;
  classify, by the computing system, the set of entities using the entity information in order to obtain a classification for attributes of the set of entities, wherein the classification for the attributes of the set of entities identifies a type of the set of entities in the column of data;
  transform, automatically by the computing system, the data set based on the classification and the entity information by generating a transformed data set comprising classification attribute metadata for the set of entities in the normalized data set comprising the data set having the common format in the second column of data;
  determine, by the computing system, a transform script comprising a plurality of transformations applied to the normalized data to generate the transformed data set; and
  render, by the computing system, a graphical interface that displays the transformed data set and the transform script comprising the plurality of transformations applied to the normalized data set in the column of data to generate the transformed data set;
  receive, via the graphical interface, an input by a user selecting the transform script comprising the plurality of transformations;
  apply the selected transform script to the data set; and
  generate the transformed data set based on the selected transform script.

21. The non-transitory computer readable storage medium of claim 20, wherein the instructions, when executed by the one or more processors, further cause the one or more processors to:
  compute a set of pattern metrics, wherein each of the set of pattern metrics is computed for a different pattern in the set of patterns, and wherein the set of patterns includes a plurality of different patterns identified for the set of entities;
  determine a difference amongst the set of pattern metrics; and
  select, based on the difference amongst the set of pattern metrics, a pattern in the set of patterns, wherein the classification is determined based on the selected pattern.

22. The non-transitory computer readable storage medium of claim 20, wherein the instructions, when executed by the one or more processors, further cause the one or more processors to:
  identify text data in the normalized data set, the text data corresponding to each entity of the set of entities;
  determine a set of classifications for the set of entities; and
  compute a set of classification metrics, each of the set of classification metrics computed for a different classification in the set of classifications; and
  wherein the classification is determined based on determining a difference amongst the set of classifications.

23. The non-transitory computer readable storage medium of claim 20, wherein normalizing the data set to create the normalized data includes modifying the data set having the first format to an adjusted format of the normalized data set, the adjusted format being different from the first format.

24. The non-transitory computer readable storage medium of claim 20, wherein identifying the set of patterns includes comparing column data amongst a plurality of columns in the normalized data set, and determining that each of a set of columns in the plurality of columns has an attribute, and wherein the set of patterns for the set of entities is identified based on the normalized data for each column having the attribute.

25. The non-transitory computer readable storage medium of claim 20, wherein the transformed data set may be generated from the normalized data set by modifying the normalized data set to include data about the classification for the set of entities.

26. The non-transitory computer readable storage medium of claim 20, wherein the instructions, when executed by the one or more processors, further cause the one or more processors to:
  render an additional graphical interface that displays the normalized data, that identifies the entity information, and that indicates the classification; and
  receive an input indicating selection of the classification in the additional graphical interface,
  wherein the transformed data set is generated upon receiving the input.

* * * * *